(12) United States Patent
Suzuki et al.

(10) Patent No.: US 12,276,793 B2
(45) Date of Patent: Apr. 15, 2025

(54) DISPLAY APPARATUS, OPTICAL MEMBER, METHOD FOR MANUFACTURING OPTICAL MEMBER, AND STAMPING APPARATUS

(71) Applicant: SONY GROUP CORPORATION, Tokyo (JP)

(72) Inventors: Nobuhiro Suzuki, Tokyo (JP); Akio Machida, Tokyo (JP); Takuji Yoshida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 198 days.

(21) Appl. No.: 17/928,489

(22) PCT Filed: Jun. 2, 2021

(86) PCT No.: PCT/JP2021/020989
§ 371 (c)(1),
(2) Date: Nov. 29, 2022

(87) PCT Pub. No.: WO2021/251237
PCT Pub. Date: Dec. 16, 2021

(65) Prior Publication Data
US 2023/0204960 A1    Jun. 29, 2023

(30) Foreign Application Priority Data
Jun. 10, 2020 (JP) .................................. 2020-100738

(51) Int. Cl.
*G02B 27/01* (2006.01)
*B29D 11/00* (2006.01)
*F21V 8/00* (2006.01)

(52) U.S. Cl.
CPC .... *G02B 27/0172* (2013.01); *B29D 11/00663* (2013.01); *G02B 6/0088* (2013.01); *G02B 27/0176* (2013.01); *G02B 2027/0178* (2013.01)

(58) Field of Classification Search
None
See application file for complete search history.

(56) References Cited

U.S. PATENT DOCUMENTS 8,029,132 B1* 10/2011 Park .................... G02C 7/12
351/86
2002/0060758 A1* 5/2002 Jeong .................. G02B 6/0088
362/628

(Continued)

FOREIGN PATENT DOCUMENTS

JP    2002-540949 A    12/2002
JP    2005-521099 A    7/2005

(Continued)

OTHER PUBLICATIONS

International Search Report and Written Opinion of PCT Application No. PCT/JP2021/020989, issued on Aug. 31, 2021, 10 pages of ISRWO.

*Primary Examiner* — Jerry Rahll
(74) *Attorney, Agent, or Firm* — CHIP LAW GROUP

(57) ABSTRACT

To provide an optical member that enables a light guiding plate to be firmly fixed with certainty to a rim portion using an adhesive.

An optical member of the present disclosure that guides light that enters from an image forming apparatus such that the light exits the optical member to be headed for an observer, includes a light guiding plate 41 that is formed of a resin plate 41', a first deflection mechanism 42, and a second deflection mechanism 43. Light that enters the light guiding plate 41 from the image forming apparatus is deflected by the first deflection mechanism 42, is totally reflected within the light guiding plate 41 to propagate through the light guiding plate 41, is then deflected by the second deflection mechanism 43, and exits the light guiding plate 41 to be headed for the observer. The light guiding plate 41 includes (Continued)

a protrusion 51 that extends from a portion of a lateral surface of the light guiding plate 41. Further, the light guiding plate 41 is fixed to an interior lateral face 11A of a rim portion 11 using an adhesive 52 in a state in which a tip of the protrusion 51 is in contact with the interior lateral face 11A of the rim portion 11.

18 Claims, 28 Drawing Sheets

(56) References Cited

U.S. PATENT DOCUMENTS

| | | | |
|---|---|---|---|
| 2008/0278661 A1* | 11/2008 | Oh | G02B 6/0088 362/614 |
| 2010/0066938 A1* | 3/2010 | Lee | G02B 6/0088 349/58 |
| 2013/0027634 A1* | 1/2013 | Saneto | G02F 1/133536 349/62 |
| 2013/0308074 A1* | 11/2013 | Park | G02F 1/133308 362/634 |
| 2014/0232619 A1* | 8/2014 | Hiraide | G02B 27/0176 345/8 |
| 2015/0277125 A1* | 10/2015 | Hirano | G02B 27/0176 359/633 |
| 2017/0168228 A1* | 6/2017 | Yu | G02B 6/0088 |
| 2019/0011779 A1* | 1/2019 | Lee | G02B 6/003 |
| 2019/0331921 A1* | 10/2019 | Suzuki | G02B 27/02 |
| 2024/0142694 A1* | 5/2024 | Huang | G02B 6/0065 |

FOREIGN PATENT DOCUMENTS

| | | |
|---|---|---|
| JP | 2008-065262 A | 3/2008 |
| JP | 2010-032997 A | 2/2010 |
| JP | 3166052 U | 2/2011 |
| JP | 2013-109301 A | 6/2013 |
| JP | 2013-152407 A | 8/2013 |
| JP | 2014-132328 A | 7/2014 |
| JP | 2014-160112 A | 9/2014 |
| JP | 2015-184561 A | 10/2015 |
| WO | 2018/135193 A1 | 7/2018 |

* cited by examiner

DISPLAY APPARATUS, OPTICAL MEMBER, METHOD FOR MANUFACTURING OPTICAL MEMBER, AND STAMPING APPARATUS

CROSS REFERENCE TO RELATED APPLICATIONS

This application is a U.S. National Phase of International Patent Application No. PCT/JP2021/020989 filed on Jun. 2, 2021, which claims priority benefit of Japanese Patent Application No. JP 2020-100738 filed in the Japan Patent Office on Jun. 10, 2020. Each of the above-referenced applications is hereby incorporated herein by reference in its entirety.

TECHNICAL FIELD

The present disclosure relates to a display apparatus, and in particular to a display apparatus used for a head-mounted display (HMD). The present disclosure further relates to an optical member that is suitable for use in the display apparatus, a method for manufacturing the optical member, and a stamping apparatus that is suitable for manufacturing the optical member.

BACKGROUND ART

In recent years, an augmented reality (AR) technology that combines, as additional information, a virtual object and various information with a real environment (or a portion thereof) to obtain electronic information, and presents the electronic information has attracted attention. For example, a head-mounted display has been discussed as an apparatus used to present visual information, in order to provide such an augmented reality technology. Further, regarding the field of application, the augmented reality technology is expected to support operations in a real environment, and examples of the field of application include provision of directional guide information, and provision of technical information to an engineer who is involved in, for example, maintenance. In particular, a head-mounted display is very useful since the hands can be used. Further, a user can capture various information or the like that is a video or an image, and an external environment at the same time in the field of view when the user obtains the various information or the like while moving outdoors. This enables the user to move smoothly. Further, such a head-mounted display is known from, for example, Japanese Patent Application Laid-open No. 2010-032997, where a light guiding plate that includes an optical member (such as SF11) is fitted into a rim portion included in a frame of the head-mounted display. Further, a head-mounted display of which a light guiding mechanism is made of resin in order to make the head-mounted display lighter is known from, for example, Japanese Patent Application Laid-open No. 2013-109301.

In the case of general glasses, a method including forming, on a lateral surface of a lens (an edge surface), a protrusion (a bevel) having a V-shaped cross section, fitting the bevel into a groove formed in a rim portion, and fastening the rim portion using a screw is often used as a method for fixing a lens to a rim portion included in a frame, as is known from Japanese Patent Application Laid-open No. 2008-065262.

CITATION LIST

Patent Literature

Patent Literature 1: Japanese Patent Application Laid-open No. 2010-032997

Patent Literature 2: Japanese Patent Application Laid-open No. 2013-109301

Patent Literature 3: Japanese Patent Application Laid-open No. 2008-065262

DISCLOSURE OF INVENTION

Technical Problem

When a light guiding plate is made of glass, the use of the fixation method disclosed in Japanese Patent Application Laid-open No. 2008-065262 makes it possible to obtain desired light guiding characteristics. On the other hand, a light guiding plate made of resin is light, but is easily deformed. Thus, when the fixation method disclosed in Japanese Patent Application Laid-open No. 2008-065262 is used, the light guiding plate will be deformed and desired light guiding characteristics will not be obtained. When a method for fixing a light guiding plate to a rim portion using an adhesive is used, it may be difficult to develop the bonding strength.

Thus, it is an object of the present disclosure to provide a display apparatus, an optical member that is suitable for use in the display apparatus, a method for manufacturing the optical member, and a stamping apparatus that is suitable for manufacturing the optical member, the display apparatus having a configuration or structure that enables a light guiding plate to be firmly fixed with certainty to a rim portion included in a frame using an adhesive.

Solution to Problem

A display apparatus of the present disclosure that is used to achieve the object described above includes
 a frame that includes a rim portion; and
 an image display apparatus that is attached to the frame, the image display apparatus including
  an image forming apparatus, and
  an optical member that guides an image coming from the image forming apparatus to a pupil of an observer,
 the optical member including
  a light guiding plate that is formed of a resin plate, and includes a first surface and a second surface that faces the first surface,
  a first deflection mechanism that is provided to the first surface or the second surface of the light guiding plate, and
  a second deflection mechanism that is provided to the first surface or the second surface of the light guiding plate, in which
 light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer,
 the light guiding plate includes a protrusion that extends from a portion of a lateral surface of the light guiding plate, and
 the light guiding plate is fixed to an interior lateral face of the rim portion using an adhesive in a state in which a tip of the protrusion is in contact with the interior lateral face of the rim portion. Note that the term "total reflection" refers to an internal total reflection or a total reflection within the light guiding plate. The light entering from the image forming apparatus is totally reflected within the light guiding plate to propagate through the light guiding plate, and then the light exits the light guiding plate to be headed for the observer. The second deflection mechanism includes a virtual image forming region of the optical member.

An optical member of the present disclosure that is used to achieve the object described above is an optical member that guides light that enters from an image forming apparatus such that the light exits the optical member to be headed for an observer, the optical member including:
- a light guiding plate that is formed of a resin plate, and includes a first surface and a second surface that faces the first surface;
- a first deflection mechanism that is provided to the first surface or the second surface of the light guiding plate; and
- a second deflection mechanism that is provided to the first surface or the second surface of the light guiding plate, in which
- light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer, and
- the light guiding plate includes a protrusion that extends from a portion of a lateral surface of the light guiding plate.

A stamping apparatus of the present disclosure that is used to achieve the object described above is a stamping apparatus used to manufacture an optical member that guides light that enters from an image forming apparatus such that the light exits the optical member to be headed for an observer, the optical member including
- a light guiding plate that is formed of a resin plate, and includes a first surface and a second surface that faces the first surface,
- a first deflection mechanism that is provided to the first surface or the second surface of the light guiding plate, and
- a second deflection mechanism that is provided to the first surface or the second surface of the light guiding plate, in which
- light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer, and
- the light guiding plate includes a protrusion that extends from a portion of a lateral surface of the light guiding plate, the stamping apparatus including:
- an on-placement base on which the resin plate provided with the first deflection mechanism and the second deflection mechanism is placed;
- a fixation base that fixes, to the on-placement base, the resin plate provided with the first deflection mechanism and the second deflection mechanism;
- a lower blade used to perform stamping on the resin plate; and
- an upper blade used to perform stamping on the resin plate.

A method for manufacturing an optical member of the present disclosure that is used to achieve the object described above is a method for manufacturing an optical member that guides light that enters from an image forming apparatus such that the light exits the optical member to be headed for an observer, the optical member including
- a light guiding plate that is formed of a resin plate, and includes a first surface and a second surface that faces the first surface,
- a first deflection mechanism that is provided to the first surface or the second surface of the light guiding plate, and
- a second deflection mechanism that is provided to the first surface or the second surface of the light guiding plate, in which
- light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer, the method including:
- providing the resin plate provided with the first deflection mechanism and the second deflection mechanism; and
- performing an outer shape process on the resin plate to obtain the light guiding plate having a desired outer shape and including a protrusion that extends from a portion of a lateral surface of the light guiding plate.

MODE(S) FOR CARRYING OUT THE INVENTION

Figure 1A:
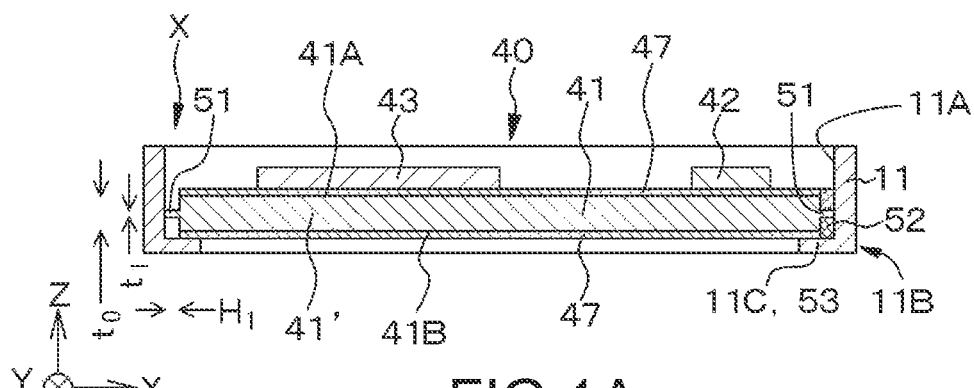
FIG. 1A is a schematic cross-sectional view of an optical apparatus of a first embodiment.

The present disclosure is described below on the basis of embodiments with reference to the drawings. However, the present disclosure is not limited to the embodiments, and various numerical values and materials in the embodiments are merely illustrative. Note that the description is made in the following order.

1. General Descriptions of Display Apparatus of Present Disclosure, Optical Member of Present Disclosure, Method for Manufacturing Optical Member, and Stamping Apparatus of Present Disclosure
2. First Embodiment (Display Apparatus of Present Disclosure and Optical Member of Present Disclosure)
3. Second Embodiment (Method for Manufacturing Optical Member and Stamping Apparatus of Present Disclosure)
4. Third Embodiment (Modification of First and Second Embodiments, Image Forming Apparatus Having First Configuration)
5. Fourth Embodiment (Modification of First and Second Embodiments, Image Forming Apparatus Having Second Configuration)
6. Fifth Embodiment (Modification of Third and Fourth Embodiments)
7. Fifth Embodiment (Modification of Display Apparatus of First Embodiment and Method for Manufacturing Display Apparatus)

8. Others

General Descriptions of Display Apparatus of Present Disclosure, Optical Member of Present Disclosure, Method for Manufacturing Optical Member, and Stamping Apparatus of Present Disclosure A light guiding plate that is included in a display apparatus of the present disclosure, a light guiding plate that is included in an optical member of the present disclosure, and a light guiding plate that is included in an optical member that is obtained by an optical member manufacturing method of the present disclosure are hereinafter collectively referred to as a "light guiding plate according to the present disclosure" for convenience.

$t1/t0 \leq 0.05$, and favorably, $0.01 \leq t1/t0 \leq 0.05$ may be satisfied when a thickness of the light guiding plate according to the present disclosure is $t0$ and a thickness of a protrusion is $t1$. When the value of $t1/t0$ is set to the value described above, the light guiding plate and a rim portion are not easily misaligned in a state in which a tip of the protrusion of the light guiding plate is in contact with an interior lateral face of the rim portion. Further, when the light guiding plate and the rim portion are aligned with each other, the tip of the protrusion is moderately deformed. This results in preventing a body of the light guiding plate from being deformed due to stress from the rim portion.

$0.05 \leq H1/t0 \leq 0.2$ may be satisfied when the thickness of the light guiding plate according to the present disclosure including the favorable configuration described above is $t0$ and a height of the protrusion that is measured from a lateral surface of the light guiding plate is $H1$. When the value of $H1/t0$ is set to the value described above, the light guiding plate and the rim portion are not easily misaligned in a state in which the tip of the protrusion of the light guiding plate is in contact with the interior lateral face of the rim portion. Further, when the light guiding plate and the rim portion are aligned with each other, the tip of the protrusion is moderately deformed. This results in preventing the body of the light guiding plate from being deformed due to stress from the rim portion, and in maintaining the strength of the protrusion of the light guiding plate at a desired value. Furthermore, it is desirable that $1 \leq L1/t0$ be satisfied when a length of the protrusion that is measured along the lateral surface of the light guiding plate is $L1$. When $1 \leq L1/t0$ is satisfied, this makes it possible to effectively prevent the light guiding plate and the rim portion from being misaligned. The protrusion may be situated over almost all of the periphery of the light guiding plate. When the protrusion is provided along one side of the light guiding plate, it is sufficient if at least one protrusion is provided along the one side of the light guiding plate. It is favorable that the protrusion be provided to at least three out of four sides of the light guiding plate, although there may be a side that is not provided with the protrusion.

In the display apparatus of the present disclosure including the favorable configurations described above, a light-guiding-plate receiving portion may be provided to the rim portion to face an outer peripheral portion of the light guiding plate. Further, in this case, the light-guiding-plate receiving portion may be provided to the rim portion to face a portion of the outer peripheral portion of the light guiding plate. The light-guiding-plate receiving portion may include a projecting portion that projects from an edge of the rim portion that is situated on a side of a second surface of the light guiding plate (specifically, a projecting portion that projects inward of the rim portion), and the light guiding plate is fixed to the rim portion in a state of the outer peripheral portion of the light guiding plate being in contact with the light-guiding-plate receiving portion. For example, the light-guiding-plate receiving portion may be provided to a middle portion of a long side of the light guiding plate, or to a middle portion of a short side of the light guiding plate, or to the middle portions of the long side and the short side of the light guiding plate, or to a corner portion of the light guiding plate. When the light-guiding-plate receiving portion is provided along the side of the light guiding plate, or when the light-guiding-plate receiving portion is provided to the corner portion of the light guiding plate, it is sufficient if the light-guiding-plate receiving portion has a length of 1 mm or greater in order to fix the light guiding plate with certainty. The side of the light guiding plate may be straight or curved. In other words, the light guiding plate may have a curved side.

Further, in the display apparatus of the present disclosure including the favorable configurations described above, all of the periphery of the light guiding plate may be fixed to the interior lateral face of the rim portion using an adhesive, or a portion of the light guiding plate may be fixed to the interior lateral face of the rim portion using the adhesive. In the latter case, it is favorable that the portion of the light guiding plate, which is fixed to the interior lateral face of the rim portion using the adhesive, have a length that is greater than or equal to 40% of all of the periphery of the light guiding plate.

Furthermore, in the display apparatus of the present disclosure including the favorable configurations described above, the adhesive may be an ultraviolet (UV) curable adhesive. Specifically, examples of a material of the adhesive include an acrylic resin, a urethane resin, a silicone resin, a fluorine resin, a polyimide resin, and an epoxy resin. The use of an ultraviolet curable adhesive as the adhesive enables the light guiding plate to be fixed to the interior lateral face of the rim portion in a short time. Consequently, the takt time for manufacturing an optical member does not become long. Examples of a method for applying an adhesive include any kinds of printing such as screen printing and ink-jet printing and any kinds of application such as a method using a dispenser.

Moreover, the light guiding plate according to the present disclosure including the favorable configurations described above may be formed of a transparent resin plate. The light guiding plate may include two parallel surfaces (a first surface and the second surface) that each extend parallel to an axis of the light guiding plate (that is the longitudinal direction or the horizontal direction, and that corresponds to an X-axis direction). A width direction of the light guiding plate (that is the height direction or the vertical direction) corresponds to a Y-axis direction. When a surface of the light guiding plate from which light enters the light guiding plate is called an entrance surface, and a surface of the light guiding plate from which light exits the light guiding plate is called an exit surface, the second surface may be the light entrance surface and the light exit surface, or the first surface may be the light entrance surface and the second surface may be the light exit surface. An interference fringe of a hologram diffraction grating film described later extends substantially parallel to the Y-axis direction. Examples of a material of a resin plate of the light guiding plate include plastic materials such as a cycloolefin polymer (COP), a polycarbonate resin, an acrylic resin such as PMMA, a stacking structure of a polycarbonate resin and an acrylic resin, an amorphous polypropylene resin, and a styrene resin including a styrene acrylonitrile resin. However, the material of the resin plate of the light guiding plate is not limited to those materials.

Further, a hard coat layer may be formed on the first surface and the second surface of the light guiding plate according to the present disclosure including the favorable configurations described above. Furthermore, in this case, the hard coat layer does not necessarily have to be formed on the lateral surface of the light guiding plate, and this makes it possible to produce a high-adhesion bonding of the light guiding plate and the rim portion. Moreover, in these cases, the hard coat layer may be made of an organic material of which a contact angle with respect to water that is obtained using ($\theta/2$) is greater than or equal to 100 degrees and of which a pencil hardness is greater than or equal to 4H. A first deflection mechanism and a second deflection mechanism are formed on the hard coat layer. The formation of a hard coat layer having such characteristics makes it possible to prevent the light guiding plate or the resin plate from being contaminated and to protect the surface of the light guiding plate or the surface of the resin plate. Further, the hard coat layer is not easily damaged during manufacturing of an optical member.

Examples of a material of the hard coat layer include a silicone material, a urethane resin material, an acrylic resin material, a multifunctional acrylate material, and a silane material. It is favorable that dipping be adopted as a method for forming a hard coat layer in order to improve the thickness uniformity. Specifically, dust and the like are removed from the surface of a formed resin plate, and then a hard coat solution selected from hard coat solutions of these materials is applied to the surface of the resin plate by dipping. Thereafter, the solution is dried and hardened to form a hard coat layer on the surface of the resin plate. Note that stamping is performed on the resin plate to obtain a light guiding plate. Thus, the hard coat layer is not formed on the lateral surface of the light guiding plate. It is desirable that the hard coat layer have a thickness of from 1 μm to 30 μm, and favorably, a thickness of from 1 μm to 15 μm. The hard coat layer having a thickness of less than 1 μm is insufficiently durable, and the hard coat layer having a thickness of greater than 30 μm results in easily causing a crack in the hard coat layer. When adhesion between the hard coat layer and the resin plate is not sufficient, a primer coat is applied to the resin plate, and then a hard coat solution is applied to the resin plate. This makes it possible to improve the adhesion.

In the optical member manufacturing method of the present disclosure, an outer shape process may be stamping. Further, in the optical member manufacturing method including such a favorable configuration, the first deflection mechanism and the second deflection mechanism may be formed integrally with the resin plate. Here, it is favorable that the resin plate be formed using a polycarbonate resin, although the resin plate is not limited thereto. Furthermore, the first deflection mechanism and the second deflection mechanism may each include a diffractive optical element (DOE). Before the outer shape process, the resin plate may have a doughnut-like outer shape or an outer shape that is the same shape as a compact disc (CD).

A stamping apparatus of the present disclosure may further include
- an alignment reference point that is provided to an on-placement base, and
- an alignment mechanism that aligns the first deflection mechanism or the second deflection mechanism with the alignment reference point to control a relationship in relative position between the on-placement base and a direction horizontal to a lower blade and an upper blade. Further, in the stamping apparatus of the present disclosure including such a favorable configuration, a specified space may be formed between the lower blade and the upper blade upon performing stamping on a resin plate. Note that, when there is a need to provide a protrusion to a specific region in the light guiding plate, it is sufficient if a space between the lower blade and the upper blade that corresponds to the specific region is made larger than a space between the lower blade and the upper blade in a region other than the specific region. Further, in the stamping apparatus of the present disclosure including the various favorable configurations, a concave portion may be formed in a portion, in the on-placement base or a fixation base, that faces the deflection mechanism, and the deflection mechanism and the on-placement base or the fixation base may be out of contact with each other.

In the display apparatus of the present disclosure including the various favorable configurations described above, a frame includes the rim portion arranged in front of an observer, temple portions that respectively extend from two ends of the rim portion, and pad portions, and the frame is worn on the head of the observer. The two temple portions may be respectively rotatably attached to the two ends of the rim portion through respective hinges, or the rim portion and the two temple portions may be integrated. A temple-tip covering portion (a celluloid tip portion) is attached to a tip of each temple portion as necessary. The pad portion may be attached to the rim portion. The frame generally has the same appearance as ordinary glasses or sunglasses when the entirety of the display apparatus of the present disclosure is viewed. A material of the frame including the pad portion may be the same as the material of ordinary glasses or sunglasses, such as metal, an alloy, plastics, or a combination thereof. A speaker or headphones may be attached to the temple portion, or an image-capturing apparatus (a camera) may be attached to the rim portion.

The image forming apparatus may be attached to a temple-portion side of the rim portion. Specifically, it is sufficient if a housing that accommodates therein the image forming apparatus is attached to the temple-portion side of the rim portion, or to the temple portion, or the housing is attached to a portion including the rim portion on the temple-portion side and the temple portion. It is sufficient if the attachment of the image forming apparatus (or the attachment of the housing) is performed by an appropriate method such as a method using a screw.

In the display apparatus of the present disclosure including the various favorable configurations described above, the optical member may further include a light adjusting apparatus that adjusts an amount of external light that enters from the outside.

In the display apparatus of the present disclosure including the various favorable configurations described above, the first deflection mechanism and the second deflection mechanism may each include a hologram diffraction grating film. Further, the first deflection mechanism and the second deflection mechanism may also each include a DOE, as described above.

When the first deflection mechanism and the second deflection mechanism each include a hologram diffraction grating film, light entering the light guiding plate is diffracted by or reflected off the first deflection mechanism, and light being totally reflected within the light guiding plate to propagate through the light guiding plate is diffracted by or reflected off the second deflection mechanism. The hologram diffraction grating film may include a reflective hologram diffraction grating film or a transmissive hologram diffraction grating film, or one of the hologram diffraction grating films may include a reflective hologram diffraction grating film and another of the hologram diffraction grating films may include a transmissive hologram diffraction grating film. Examples of the reflective hologram diffraction grating film include a reflective volume-hologram diffraction grating film. The first deflection mechanism including a reflective volume-hologram diffraction grating film may be referred to as a "first diffraction grating member" for convenience, and the second deflection mechanism including a reflective volume-hologram diffraction grating film may be referred to as a "second diffraction grating member" for convenience.

Further, when all of the light entering the light guiding plate is reflected off the first deflection mechanism, the first deflection mechanism may include a light reflective film (a type of mirror) that is made of, for example, metal including an alloy and off which light that enters the light guiding plate is reflected. Further, when a portion of the light entering the light guiding plate is reflected off the first deflection mechanism, the first deflection mechanism may include a multilayer stacking structure that includes multilayered dielectric film stacks, a half mirror, a polarization beam splitter, or a diffraction grating (such as a hologram diffraction grating film). On the other hand, parallel light that is totally reflected within the light guiding plate to propagate through the light guiding plate is reflected off or diffracted by the second deflection mechanism, and exits the light guiding plate in the form of the parallel light. The second deflection mechanism may include a multilayer stacking structure that includes multilayered dielectric film stacks, a half mirror, a polarization beam splitter, or a hologram diffraction grating film. In some cases, one of the first deflection mechanism and the second deflection mechanism may be arranged within the light guiding plate.

The light guiding plate may be a transparent plate, and may include two parallel surfaces (the first surface and the second surface) that each extend parallel to the axis of the light guiding plate (that is the longitudinal direction or the horizontal direction, and that corresponds to the X-axis direction). The width direction of the light guiding plate (that is the height direction or the vertical direction) corresponds to the Y-axis direction. When a surface of the light guiding plate from which light enters the light guiding plate is called an entrance surface, and a surface of the light guiding plate from which light exits the light guiding plate is called an exit surface, the second surface may be the light entrance surface and the light exit surface, or the first surface may be the light entrance surface and the second surface may be the light exit surface. An interference fringe of a hologram diffraction grating film extends substantially parallel to the Y-axis direction.

The optical member is a semi-transmissive (see-through) optical member. Specifically, at least a portion of the optical member that faces an eyeball (pupil) of the observer is made semi-transmissive (see-through), and this makes it possible to see outside through this portion of the optical member. The display apparatus of the present disclosure may include a single image display apparatus (a monocular display apparatus) or two image display apparatuses (a binocular display apparatus).

The term "semi-transmissive" may be used herein. The term does not mean that ½ (50%) of incident light is transmitted or reflected, but means that a portion of the incident light is transmitted and the other portion is reflected.

The image display apparatus included in the display apparatus of the present disclosure makes it possible to display an image in one color (for example, green). In this case, the angle of view may be divided into, for example, two (more specifically, equally divided into two), and the first deflection mechanism may include two stacked hologram diffraction grating films corresponding to the respective angles of view obtained by the division. Alternatively, the first deflection mechanism may be provided to each of the first surface and the second surface of the light guiding plate. Further, when a color image is displayed, the first diffraction grating member or the second diffraction grating member may include stacked P reflective volume-hologram diffraction grating films, in order to meet a diffractive reflection of P types of pieces of light of P different types of wavelength bands (or wavelengths), where, for example, P=3, and the P types are three types of red, green, and blue. An interference fringe corresponding to one type of wavelength band (or wavelength) is formed in a corresponding one of the hologram diffraction grating films. Further, in order to meet a diffractive reflection of P types of pieces of light of P different types of wavelength bands (or wavelengths), P types of interference fringes may be formed in a single hologram diffraction grating film. Furthermore, for example, a first light guiding plate may include a reflective volume-hologram diffraction grating film off which light of a red wavelength band (or wavelength) is diffractively reflected, a second light guiding plate may include a reflective volume-hologram diffraction grating film off which light of a green wavelength band (or wavelength) is diffractively reflected, a third light guiding plate may include a reflective volume-hologram diffraction grating film off which light of a blue wavelength band (or wavelength) is diffractively reflected, and a structure may be adopted that includes the first light guiding plate, the second light guiding plate, and the third light guiding plate being stacked with spacing between them. Further, the angle of view may be equally divided into, for example, three, and the first diffraction grating member or the second diffraction grating member may include stacked hologram diffraction grating films corresponding to the respective angles of view. Furthermore, the adoption of such a configuration makes it possible to increase the efficiency in diffraction when light of each wavelength band (or wavelength) is diffractively reflected off the first diffraction grating member or the second diffraction grating member, to increase an acceptable angle of the diffraction, and to optimize an angle of the diffraction.

Examples of a material of the diffraction grating member include a photopolymer material. It is sufficient if the material and basic structures of the first diffraction grating member and second diffraction grating member each including a reflective volume-hologram diffraction grating film are similar to a material and a structure of a conventional reflective volume-hologram diffraction grating film. The reflective volume-hologram diffraction grating film refers to a hologram diffraction grating film off which only +1st-order diffracted light is diffractively reflected. An interference fringe is formed from the interior of the diffraction grating member to the surface of the diffraction grating member, and it is sufficient if a method for forming such an interference fringe itself is similar to a conventional formation method. Specifically, it is sufficient if, for example, object light is irradiated onto a member (such as a photopolymer material) included in a diffraction grating member from a first specified direction on one side of the member, reference light is irradiated onto the member included in the diffraction grating member from a second specified direction on the other side of the member at the same time as the irradiation of the object light, and an interference fringe formed by the object light and the reference light is recorded in the member included in the diffraction grating member. The appropriate selection of the first specified direction, the second specified direction, and wavelengths of the object light and the reference light makes it possible to obtain a desired pitch of an interference fringe on the surface of the diffraction grating member and a desired angle of inclination (a slant angle) of an interference fringe. The angle of inclination of an interference fringe refers to an angle formed by the surface of a diffraction grating member and the interference fringe. When the first diffraction grating member and the second diffraction grating member each have a stacking structure in which P reflective volume-hologram diffraction grating films are stacked, it is sufficient if such a stack of hologram diffraction grating films is obtained by individually producing the P hologram diffraction grating films and stacking (bonding) the individually produced P hologram diffraction grating films using, for example, an ultraviolet curable adhesive. Further, the P hologram diffraction grating films may be produced by producing one hologram diffraction grating film using a viscous photopolymer material, and bonding viscous photopolymer materials one by one on the produced one hologram diffraction grating film to produce hologram diffraction grating films. The produced hologram diffraction grating films are irradiated with energy rays as necessary so that monomers, in a photopolymer material, that are not polymerized when the produced hologram diffraction grating films are irradiated with object light and reference light, are polymerized to be fixed. Further, heat treatment is performed for stabilization as necessary.

In the image display apparatus included in the display apparatus of the present disclosure including the various favorable configurations described above, the image forming apparatus may include a plurality of pixels arranged in a two-dimensional matrix. Note that, for convenience, the image forming apparatus having such a configuration is referred to as an "image forming apparatus having a first configuration".

Examples of the image forming apparatus having the first configuration include an image forming apparatus that includes a reflective spatial light modulating apparatus and a light source, an image forming apparatus that includes a transmissive spatial light modulating apparatus and a light source, and an image forming apparatus that includes a light-emitting element such as an organic electroluminescence (EL), an inorganic EL, a light-emitting diode (LED), and a semiconductor laser element. In particular, it is favorable that the image forming apparatus having the first configuration be the image forming apparatus including a reflective spatial light modulating apparatus and a light source, or the image forming apparatus including a light-emitting element. Examples of the spatial light modulating apparatus include a light bulb such as a transmissive or reflective liquid crystal display apparatus of, for example, liquid crystal on silicon (LCOS); and a digital micromirror device (DMD). Examples of the light source include a light-emitting element. Further, the reflective spatial light modulating apparatus may include a liquid crystal display apparatus and a polarization beam splitter in which a portion of light from the light source is reflected off the polarization beam splitter to be guided to the liquid crystal display apparatus, and a portion of light reflected off the liquid crystal display apparatus passes through the polarization beam splitter to be guided to an optical system. A red-light-emitting element, a green-light-emitting element, a blue-light-emitting element, and a white-light-emitting element may be used as the light-emitting elements included in the light source. Further, red light, green light, and blue light that are respectively emitted by the red-light-emitting element, the green-light-emitting element, and the blue-light-emitting element may be mixed and the brightness may be made uniform using a light pipe to obtain white light. Examples of the light-emitting element include a semiconductor laser element, a solid-state laser, and an LED. It is sufficient if the number of pixels is determined on the basis of the specifications necessary for the image display apparatus. Examples of a specific value of the number of pixels include 320×240, 432×240, 640×480, 854×480, 1024×768, and 1920×1080.

Further, in the image display apparatus included in the display apparatus of the present disclosure including the favorable configurations described above, the image forming apparatus may include a light source, and a scanning mechanism that scans parallel light emitted by the light source. Note that, for convenience, the image forming apparatus having such a configuration is referred to as an "image forming apparatus having a second configuration".

Examples of the light source included in the image forming apparatus having the second configuration include a light-emitting element. Specifically, a red-light-emitting element, a green-light-emitting element, a blue-light-emitting element, and a white-light-emitting element may be used as the light-emitting elements. Further, red light, green light, and blue light that are respectively emitted by the red-light-emitting element, the green-light-emitting element, and the blue-light-emitting element may be mixed and the brightness may be made uniform using a light pipe to obtain white light. Examples of the light-emitting element include a semiconductor laser element, a solid-state laser, and an LED. It is sufficient if the number of pixels (virtual pixels) in the image forming apparatus having the second configuration is also determined on the basis of the specifications necessary for the image display apparatus. Examples of a specific value of the number of pixels (virtual pixels) include 320×240, 432×240, 640×480, 854×480, 1024×768, and 1920×1080. Further, when a color image is displayed and the light source includes a red-light-emitting element, a green-light-emitting element, and a blue-light-emitting element, it is favorable that colors be combined using, for example, an X-prism. A microelectromechanical systems (MEMS) mirror or a galvanometer mirror that horizontally scans and vertically scans light emitted by the light source may be used as the scanning mechanism, the MEMS mirror including, for example, a two-dimensionally rotatable micromirror.

In the image forming apparatus having the first configuration or the image forming apparatus having the second configuration, light is formed into a plurality of pieces of parallel light by an optical system (an optical system that forms exiting light into parallel light, may be referred to as a "parallel-light output optical system", and is, for example, a collimating optical system or a relay optical system in particular), and the plurality of pieces of parallel light enters the light guiding plate. Such a formation of light into pieces of parallel light is necessary since it is necessary that information regarding a light wavefront when the pieces of parallel light enter the light guiding plate be continuously stored after the pieces of parallel light exit the light guiding plate through the first deflection mechanism and the second deflection mechanism. Specifically, for example, it is sufficient if, for example, a light exiting portion of the image forming apparatus is placed at a point (a position) corresponding to a focal length of the parallel-light output optical system, in order to generate a plurality of pieces of parallel light. The parallel-light output optical system includes a function of converting positional information regarding a position of a pixel into angular information regarding an angle of an optical system in the optical member. Examples of the parallel-light output optical system include an optical system that has a positive optical power as a whole and in which a convex lens, a concave lens, a freeform prism, or a hologram lens is used alone, or a combination thereof is used. A light blocking portion that includes an opening may be arranged between the parallel-light output optical system and the light guiding plate, in order to prevent undesired light from exiting the parallel-light output optical system and from entering the light guiding plate.

In the display apparatus of the present disclosure, a signal used to display an image on the image forming apparatus (a signal used to form a virtual image in the optical member) may be received from the outside. In such a configuration, information and data regarding an image to be displayed on the image forming apparatus are recorded, held, or saved in, for example, a so-called cloud computer or server. When the display apparatus includes a communication mechanism such as a cellular phone or a smartphone, or when the display apparatus and the communication mechanism are used in combination, various information and data can be communicated and exchanged between the cloud computer or server and the display apparatus, and a signal based on various information and data, that is, the signal used to display an image on the image forming apparatus (the signal used to form a virtual image in the optical member) can be received. Further, the signal used to display an image on the image forming apparatus (the signal used to form a virtual image in the optical member) may be stored in the display apparatus. The image displayed on the image forming apparatus includes various information and various data. Furthermore, the display apparatus may include an image-capturing apparatus (a camera). An image captured by the image-capturing apparatus may be transmitted to a cloud computer or a server through the communication mechanism, various information and data that correspond to the image captured by the image-capturing apparatus may be searched for in the cloud computer or the server, various information and data that are obtained by the search may be transmitted to the display apparatus through the communication mechanism, and an image may be displayed on the image display apparatus on the basis of the various information and data being obtained by the search.

When an image captured by the image-capturing apparatus is transmitted to a cloud computer or a server through the communication mechanism, the image captured by the image-capturing apparatus may be displayed on the image display apparatus and confirmed using the optical member.

For example, the display apparatus of the present disclosure including the various modifications described above can be used to receive and display an e-mail; to display, for example, various information on various sites on the Internet; to display various descriptions, a symbol, a sign, a mark, an emblem, a design, and the like that are used at the time of, for example, driving, an operation, a maintenance, and disassembling of an observation target such as various apparatuses; to display various descriptions, a symbol, a sign, a mark, an emblem, a design, and the like regarding an observation target such as a person and a product; to display a moving image and a still image; to display subtitles for, for example, a movie; to display an explanatory text and closed captions regarding a video in synchronization with the video; and to display various descriptions regarding an observation target in a play, Kabuki, Noh, Kyogen, opera, a concert, a ballet, various theaters, an amusement park, a museum, a tourist spot, a resort, tourist information services, and the like, as well as, for example, an explanatory text and closed captions that are used to describe, for example, details, the progress, and the background thereof. With respect to the play, the Kabuki, the Noh, the Kyogen, the opera, the concert, the ballet, the various theaters, the amusement park, the museum, the tourist spot, the resort, the tourist information services, and the like, it is sufficient if a text related to an observation target is displayed in the form of an image on the display apparatus at an appropriate timing. Specifically, for example, according to the progress of, for example, a movie, or according to the progress of, for example, a play, an image control signal is transmitted to the display apparatus by an operation performed by an operator, or under the control of, for example, a computer, on the basis of a specified schedule and the allotment of time, and an image is displayed on the display apparatus. Further, various descriptions regarding an observation target such as various apparatuses, a person, and a product are displayed. An image of the observation target such as various apparatuses, a person, and a product is captured by an image-capturing apparatus, and details of the captured image are analyzed by the display apparatus. This makes it possible to display, on the display apparatus, pre-created various descriptions regarding the observation target such as various apparatuses, a person, and a product.

The image signal destined for the image forming apparatus may include not only an image signal (such as text data) but also, for example, brightness data (brightness information) regarding an image to be displayed, or chromaticity data (chromaticity information) regarding an image to be displayed, or the brightness data and the chromaticity data. The brightness data may be brightness data that corresponds to the brightness of a specified region that includes an observation target viewed through the optical member, and the chromaticity data may be chromaticity data that corresponds to the chromaticity of the specified region including the observation target viewed through the optical member. Accordingly, the brightness (lightness) of an image to be displayed can be controlled by brightness data regarding an image being included, the chromaticity (color) of an image to be displayed can be controlled by chromaticity data regarding an image being included, and the brightness (lightness) and the chromaticity (color) of an image to be displayed can be controlled by brightness data and chromaticity data regarding an image being included. When the brightness data is brightness data that corresponds to the brightness of a specified region that includes an observation target viewed through the image display apparatus, it is sufficient if a value of the brightness data is set such that the brightness of an image exhibits a larger value (that is, an image is displayed more brightly) if the brightness of the specified region including the observation target viewed through the image display apparatus exhibits a larger value. Further, when the chromaticity data is chromaticity data that corresponds to the chromaticity of a specified region that includes an observation target viewed through the image display apparatus, it is sufficient if a value of the chromaticity data is set such that the chromaticity of the specified region including the observation target viewed through the image display apparatus and the chromaticity of an image to be displayed are approximately complementary colors. The complementary colors refer to paired colors lying opposite each other in a color circle. The complementary color is also a complementary color such as green for red, purple for yellow, and orange for blue. The complementary colors also refer to colors that cause a decrease in saturation when one of the colors is mixed with another of the colors in an appropriate ratio, such as white for light or black for an object. However, the complementarity with respect to a visual effect when colors are arranged side by side and the complementarity when colors are mixed are different. The complementary color is also referred to as a complement, a contrasting color, or an opposing color. Note that the complementary colors directly indicate colors that lie opposite each other, whereas the opposing colors may indicate a slightly wider range of colors. Paired complementary colors provide a synergy effect in which one of the colors brings out another of the colors. This is referred to as a harmony of complementary colors.

For example, the display apparatus of the present disclosure may be used for, for example, a head-mounted display (HMD). This makes it possible to make the display apparatus lighter and smaller, to greatly reduce an uncomfortable feeling when a user wears the display apparatus, and further to reduce manufacturing costs. Further, the display apparatus of the present disclosure can be applied to a head-up display (HUD) that is included in, for example, a vehicle or an aircraft cockpit, and to a combiner that is arranged on a windshield of, for example, a vehicle or an aircraft cockpit. Furthermore, the display apparatus of the present disclosure can also be used as a stereoscopic display apparatus. In this case, it is sufficient if a polarizing plate or a polarizing film is removably attached to the optical member, or a polarizing plate or a polarizing film is bonded to the optical member.

First Embodiment

Figure 1B:
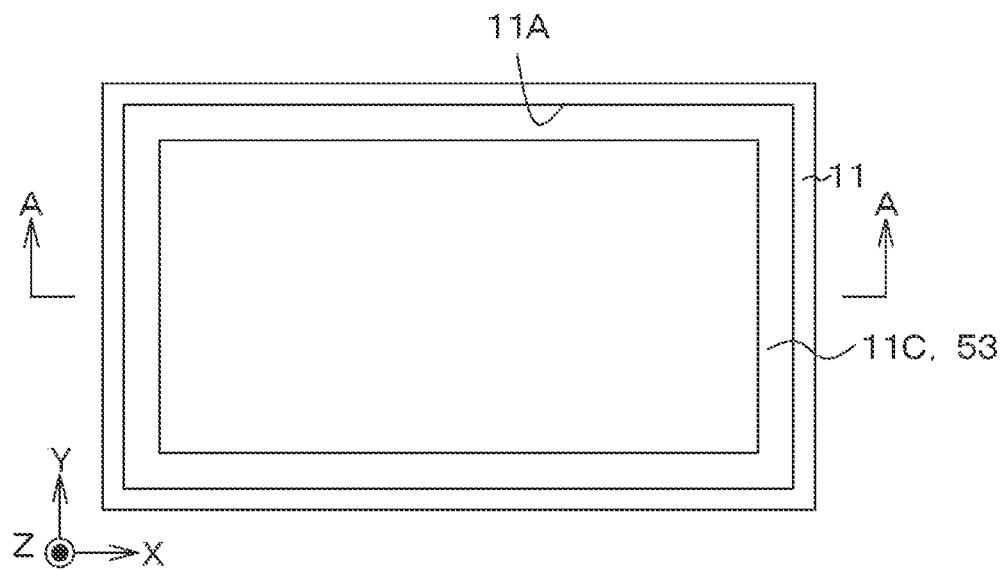
FIG. 1B is a schematic plan view of a rim portion of the first embodiment, as viewed from a side opposite to a side of an observer.
Figure 1C:
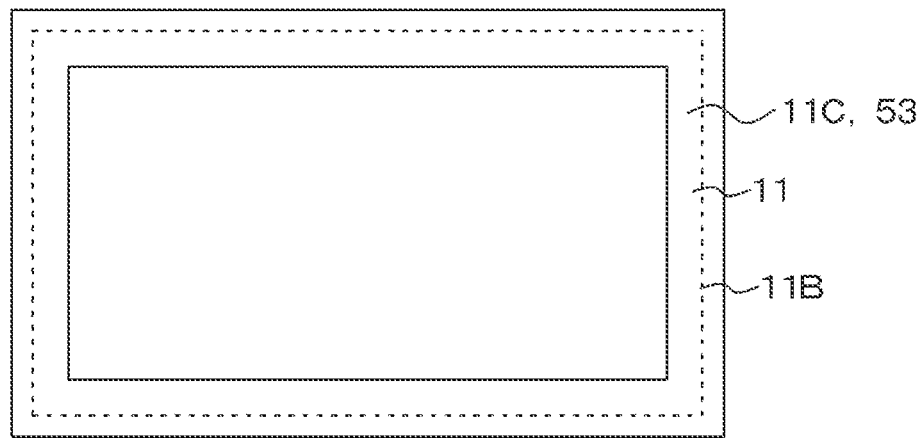
FIG. 1C is a schematic plan view of the rim portion, as viewed from the side of the observer.
Figure 2A:
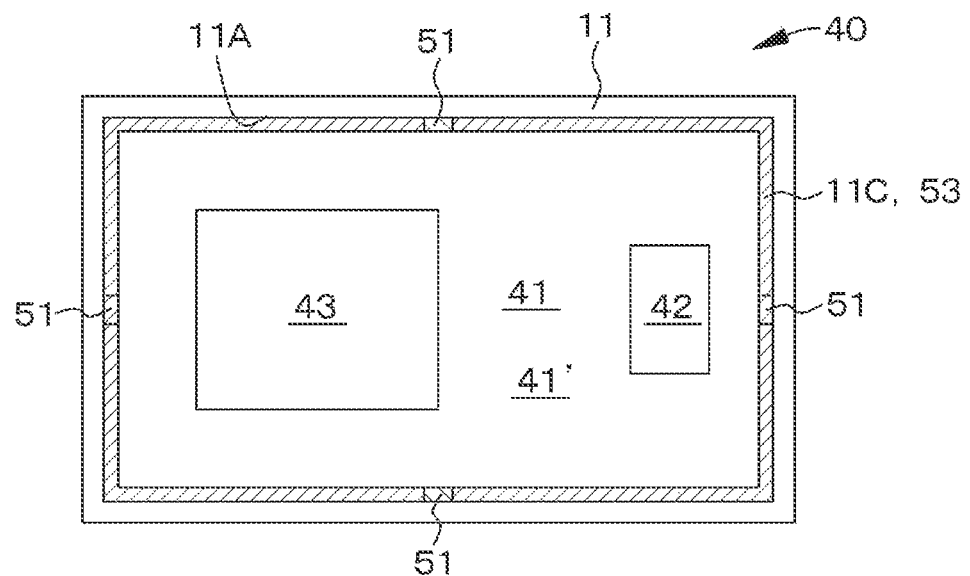
FIG. 2A schematically illustrates the arrangement of the rim portion, a light guiding plate, a first deflection mechanism, and a second deflection mechanism of the first embodiment, as viewed from the side opposite to the side of the observer.
Figure 2B:
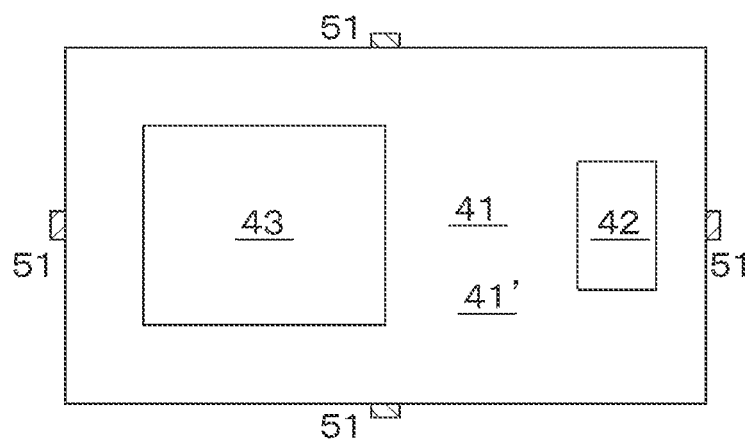
FIG. 2B is a schematic plan view of, for example, the light guiding plate.
Figure 3:
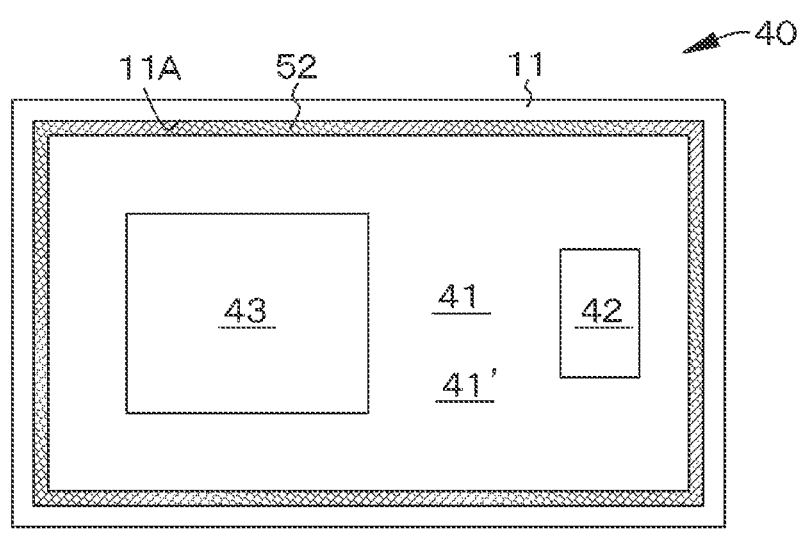
FIG. 3 schematically illustrates the arrangement of the rim portion, an adhesive, the light guiding plate, the first deflection mechanism, and the second deflection mechanism of the first embodiment, as viewed from the side opposite to the side of the observer.
Figure 13:
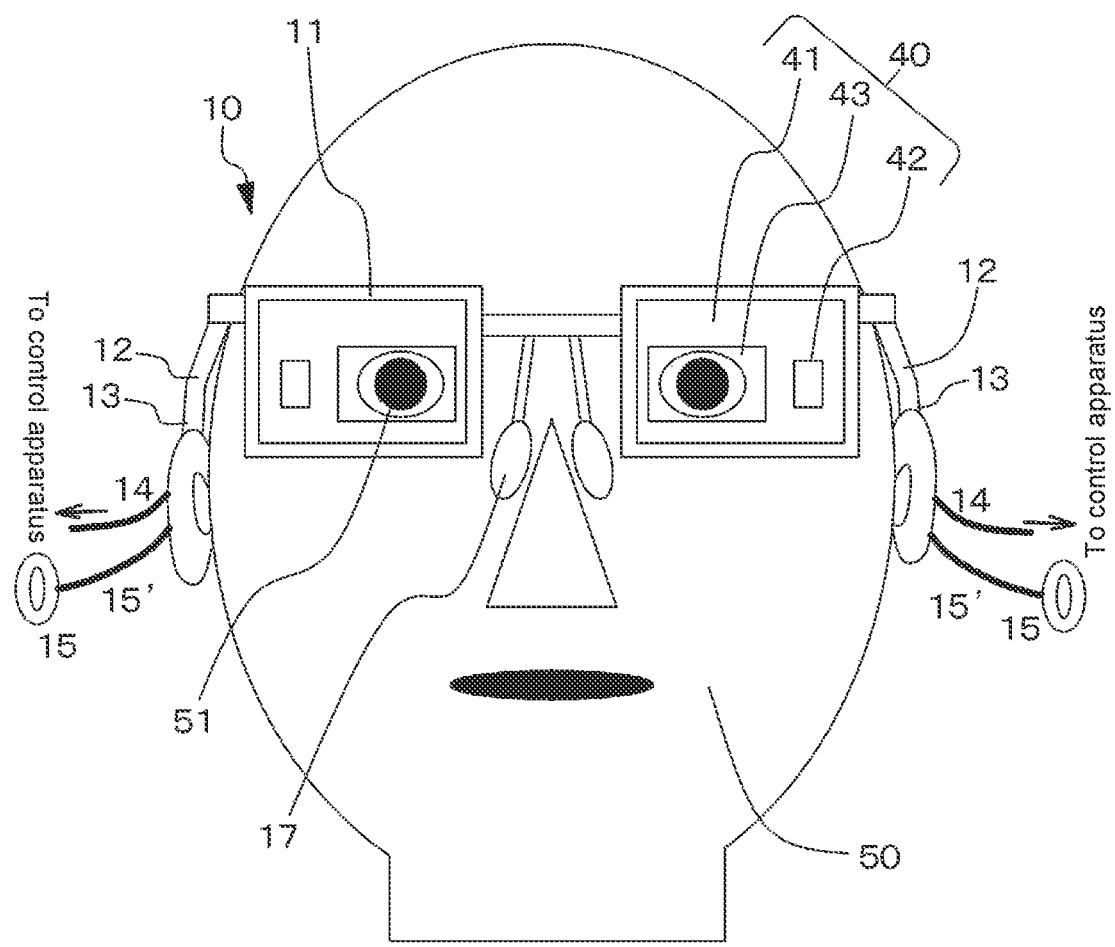
FIG. 13 schematically illustrates a display apparatus of the first embodiment, as viewed from the front.
Figure 14:
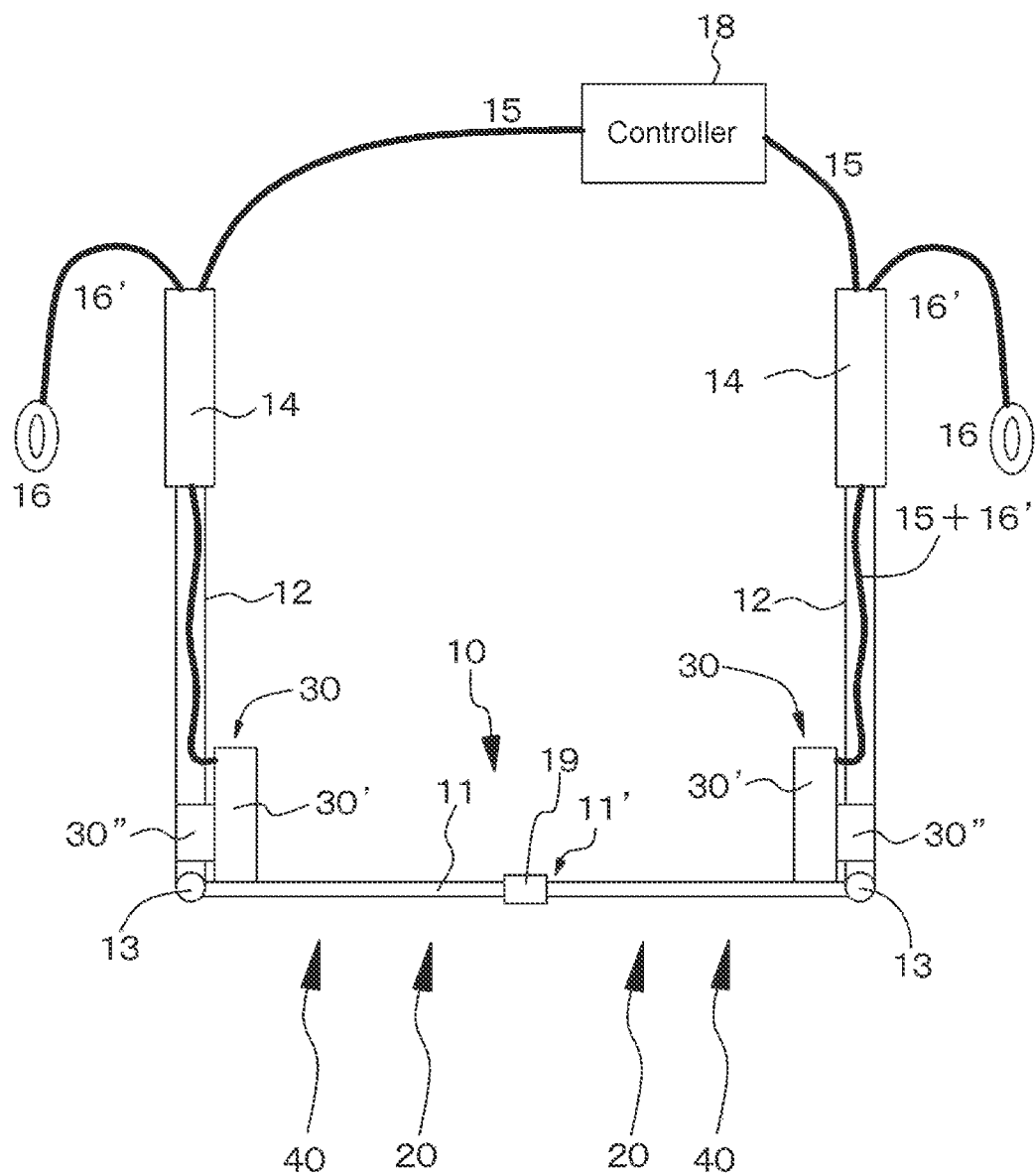
FIG. 14 schematically illustrates the display apparatus of the first embodiment, as viewed from above.

A first embodiment relates to the display apparatus and the optical member of the present disclosure. FIG. 1A is a schematic cross-sectional view of the optical apparatus of the first embodiment, FIG. 1B is a schematic plan view of a rim portion of the first embodiment, as viewed from a side opposite to a side of an observer, and FIG. 1C is a schematic plan view of the rim portion, as viewed from the side of the observer. Further, FIG. 2A schematically illustrates the arrangement of the rim portion, a light guiding plate, a first deflection mechanism, and a second deflection mechanism of the first embodiment, as viewed from the side opposite to the side of the observer, FIG. 2B is a schematic plan view of, for example, the light guiding plate, and FIG. 3 schematically illustrates the arrangement of the rim portion, an adhesive, the light guiding plate, the first deflection mechanism, and the second deflection mechanism of the first embodiment, as viewed from the side opposite to the side of the observer. Furthermore, FIG. 13 schematically illustrates the display apparatus of the first embodiment, as viewed from the front, and FIG. 14 schematically illustrates the display apparatus of the first embodiment, as viewed from above.

Note that a projecting portion is hatched in FIGS. 2A and 2B, and in FIGS. 5A, 5B, 8A, 8B, 11A, and 11B described later, in order to depict the projecting portion clearly; a light-guiding-plate receiving portion is hatched in FIG. 2A, and in FIGS. 5A, 8A, 9B, and 11A described later, in order to depict the light-guiding-plate receiving portion clearly; and the adhesive is hatched in FIG. 3, and in FIGS. 6A, 6B, 9A, 9B, 12A, and 12B described later, in order to depict the adhesive clearly.

The display apparatus of the first embodiment, or one of the display apparatuses of second to sixth embodiments described later is specifically a display apparatus that is used for a head-mounted display (HMD), the display apparatus including
a frame 10 that includes a rim portion (a front portion) 11, and
an image display apparatus 20 that is attached to the frame 10,
the image display apparatus 20 including
an image forming apparatus 30, and
an optical member 40 that guides an image coming from the image forming apparatus 30 to a pupil of an observer,
the optical member 40 including
a light guiding plate 41 that is formed of a resin plate 41', and includes a first surface 41A and a second surface 41B that faces the first surface 41A,
a first deflection mechanism 42 that is provided to the first surface 41A or the second surface 41B (specifically, the first surface 41A in the first embodiment) of the light guiding plate 41, and
a second deflection mechanism 43 that is provided to the first surface 41A or the second surface 41B (specifically, the first surface 41A in the first embodiment) of the light guiding plate 41, in which
light that enters the light guiding plate 41 from the image forming apparatus 30 through the first surface 41A or the second surface 41B (specifically, the second surface 41B in the first embodiment) is deflected by the first deflection mechanism 42, is totally reflected within the light guiding plate 41 to propagate through the light guiding plate 41, is then deflected by the second deflection mechanism 43, and exits the light guiding plate 41 through the second surface 41B to be headed for the observer 60.

Further, the light guiding plate 41 includes a protrusion (specifically, a protrusion in the form of a burr) 51 that extends from a portion of a lateral surface of the light guiding plate 41, and
the light guiding plate 41 is fixed to an interior lateral face 11A of the rim portion 11 using an adhesive 52 in a state in which a tip 51A of the protrusion 51 is in contact with the interior lateral face 11A of the rim portion 11. Note that, with respect to a region indicated by an arrow "X" in FIG. 1A, an illustration of the adhesive 52 is omitted in order to clearly depict the state in which the tip 51A of the protrusion 51 is in contact with the interior lateral face 11A of the rim portion 11.

Furthermore, the optical member 40 of the first embodiment is an optical member that guides light that enters from the image forming apparatus 30 such that the light exits the optical member 40 to be headed for the observer, the optical member 40 including
the light guiding plate 41 formed of the resin plate 41', the light guiding plate 41 including the first surface 41A, and the second surface 41B facing the first surface 41A,
the first deflection mechanism 42 provided to the first surface 41A or the second surface 41B (specifically, the first surface 41A in the first embodiment) of the light guiding plate 41, and the second deflection mechanism 43 provided to the first surface 41A or the second surface 41B (specifically, the first surface 41A in the first embodiment) of the light guiding plate 41, in which light that enters the light guiding plate 41 from the image forming apparatus 30 through the first surface 41A or the second surface 41B (specifically, the second surface 41B in the first embodiment) is deflected by the first deflection mechanism 42, is totally reflected within the light guiding plate 41 to propagate through the light guiding plate 41, is then deflected by the second deflection mechanism 43, and exits the light guiding plate 41 through the second surface 41B to be headed for the observer, and the light guiding plate 41 includes the protrusion (specifically, a protrusion in the form of a burr) 51 extending from the portion of the lateral surface of the light guiding plate 41.

The optical member 40 is a semi-transmissive (see-through) optical member. Specifically, at least a portion of the optical member 40 that faces an eyeball (the pupil) 61 of the observer 60 is made semi-transmissive (see-through), and this makes it possible to see outside through this portion of the optical member 40. As illustrated in the figure, the display apparatus may include two image display apparatuses 20 (a binocular display apparatus) or a single image display apparatus 20 (a monocular display apparatus). The image forming apparatus 30 displays an image (a virtual image) in one color (for example, green of a wavelength of 523 nm).

The light guiding plate 41 formed of the resin plate 41' made of a plastic material that is specifically cycloolefin polymer (COP) of which light transmittance is greater than or equal to 80% and of which a refractive index is 1.53, includes two parallel surfaces (the first surface 41A and the second surface 41B) that each extend in parallel with a direction (an X direction) in which light propagates through the light guiding plate 41 due to the light being totally reflected within the light guiding plate 41. The first surface 41A and the second surface 41B face each other. Further, parallel light enters the light guiding plate 41 from the second surface 41B corresponding to a light entrance surface, is totally reflected within the light guiding plate 41 to propagate through the light guiding plate 41, and then exits the light guiding plate 41 from the second surface 41B corresponding to a light exit surface. However, the configuration is not limited thereto, and the first surface 41A may be the light entrance surface, and the second surface 41B may be the light exit surface.

Further, in the display apparatus of the first embodiment, the image forming apparatus 30 is attached to a temple portion 12. Specifically, a housing 30' that accommodates therein the image forming apparatus 30 is attached to the temple portion 12 through an attachment member 30". Note that the housing 30' may be attached to the rim portion 11, or may be attached to a portion including the rim portion 11 and the temple portion 12. It is sufficient if the attachment of the image forming apparatus 30 (or the attachment of the housing 30') is performed by an appropriate method such as a method using a screw.

In the display apparatus of the first embodiment, the two temple portions 12 may each be integrated with the rim portion 11, or the temple portion 12 may be rotatably attached to an end of the rim portion 11 through a hinge 13. In other words, the frame 10 includes the rim portion 11 arranged in front of the observer 60, the two temple portions 12 respectively extending from the two ends of the rim portion 11, and temple-tip covering portions (also referred to as celluloid tips, ear-fit portions, or ear pads) 14 that are respectively attached to tips of the respective temple portions 12. The frame 10 generally has substantially the same appearance as ordinary glasses or sunglasses when the entirety of the display apparatus of the first embodiment is viewed. A material of the pad portion 17 (omitted in FIG. 14) and the frame 10 may be the same as the material of ordinary glasses or sunglasses, such as metal, an alloy, plastics, or a combination thereof.

Further, wiring (such as a signal line and a power supply line) that extends from the image forming apparatus 30 passes through the temple portion 12 and the temple-tip covering portion 14 to extend outward from a tip of the temple-tip covering portion 14, and is connected to a control apparatus (a control circuit or a control mechanism) 18. Furthermore, the image forming apparatus 30 includes a headphone portion 16, and headphone-portion wiring 16' that extends from the image forming apparatus 30 passes through the temple portion 12 and the temple-tip covering portion 14 to extend toward the headphone portion 16 from the tip of the temple-tip covering portion 14. More specifically, the headphone-portion wiring 16' passes behind the auricle (pinna) to extend toward the headphone portion 16 from the tip of the temple-tip covering portion 14. According to such a configuration, the display apparatus has a simple design without giving the impression that the headphone portion 16 and the headphone-portion wiring 16' are randomly arranged.

As described above, the wiring (such as a signal line and a power supply line) 15 is connected to the control apparatus (control circuit) 18. The control apparatus 18 includes, for example, an image information storing apparatus (not illustrated). Then, processing for displaying an image is performed by the control apparatus 18. The control apparatus 18 and the image information storing apparatus may include a well-known circuit.

In the display apparatus of the first embodiment, the first deflection mechanism (first diffraction grating member) 42 includes a hologram diffraction grating film of a thickness of 3 μm, and the second deflection mechanism (second diffraction grating member) 43 includes a hologram diffraction grating film of a thickness of 1 μm. Further, light that enters the light guiding plate 41 is diffractively reflected off the first deflection mechanism 42, and the light being totally reflected within the light guiding plate 41 to propagate through the light guiding plate 41 is diffractively reflected off the second deflection mechanism 43. The hologram diffraction grating film includes, for example, a reflective hologram diffraction grating film that is specifically a reflective volume-hologram diffraction grating film. As described above, the light guiding plate 41 is formed of the transparent resin plate 41'. The second surface 41B of the light guiding plate 41 is an entrance surface, and the first deflection mechanism (first diffraction grating member) 42 and the second deflection mechanism (second diffraction grating member) 43 are arranged on the first surface 41A being included in the light guiding plate 41 and facing the second surface 41B (specifically on a hard coat layer 47 that is formed on the first surface 41A of the light guiding plate 41).

The image display apparatus 20 will be described in detail in the third to fifth embodiments.

As illustrated in FIG. 1A, in the first embodiment, when a thickness of the light guiding plate 41 is to, a thickness of the protrusion (specifically, a protrusion in the form of a burr) 51 is t1, and a height of the protrusion (specifically, a protrusion in the form of a burr) 51 that is measured from the lateral surface of the light guiding plate 41 is H1, t1/t0≤0.05, and favorably, 0.01≤t1/t0≤0.05 are satisfied. Further, 0.05≤H1/t0≤0.2 is satisfied. The thickness t1 of the protrusion 51 does not necessarily have to be uniform, and the height H1 also does not necessarily have to be uniform. However, it is necessary that at least one protrusion (specifically, a protrusion in the form of a burr) 51 satisfy relationships of t1/t0 and of H1/t0. Furthermore, 1≤L1/t0 is satisfied. If L1/t0<1, this may result in difficulty in preventing the light guiding plate 41 and the rim portion 11 from being misaligned. Specifically, L1 is set to 2 mm in the first embodiment. Thus, L1/t0=2 mm/1 mm=2. Further, when the size of the light guiding plate 41 is 70 mm×30 mm×1.0 mm, the maximum value of L1 is 200 mm, which is the length of all of the periphery of the light guiding plate 41.

Further, in the display apparatus of the first embodiment, a light-guiding-plate receiving portion 53 is provided to the rim portion 11 to face an outer peripheral portion of the light guiding plate 41. The light-guiding-plate receiving portion 53 includes a projecting portion 11C that projects from an edge 11B of the rim portion 11 that is situated on a side of the second surface of the light guiding plate 41 (specifically, the projecting portion 11C corresponding to an extension of the rim portion 11 that projects inward of the rim portion 11). Further, the light guiding plate 41 is fixed to the rim portion 11 in a state of the outer peripheral portion of the light guiding plate 41 being in contact with the light-guiding-plate receiving portion 53.

Furthermore, in the display apparatus of the first embodiment, all of the periphery of the light guiding plate 41 is fixed to the interior lateral face 11A of the rim portion 11 using the adhesive 52 (refer to FIG. 3).

Moreover, in the display apparatus of the first embodiment, the adhesive 52 is an ultraviolet curable adhesive. Specifically, an acrylic resin is used as a material of the adhesive 52, and an amount of UV irradiation for hardening is set to 1 J/cm$^2$. The use of an ultraviolet curable adhesive makes it possible to harden an adhesive in a short time. This results in being able to increase the mass productivity.

The hard coat layer 47 of a thickness of 1 μm is formed on the first surface 41A and the second surface 41B of the light guiding plate 41. The hard coat layer 47 is not formed on the lateral surface of the light guiding plate 41. The hard coat layer 47 is made of an organic material of which a contact angle with respect to water that is obtained using (θ/2) is greater than or equal to 100 degrees and of which a pencil hardness is greater than or equal to 4H. Specifically, the hard coat layer 47 is made of an acrylic resin material of which a refractive index is 1.51, of which a contact angle with respect to water is greater than or equal to 105 degrees, and of which a pencil hardness is greater than or equal to 6H. The first deflection mechanism 42 and the second deflection mechanism 43 are formed on the hard coat layer 47. Note that the hard coat layer 47 does not necessarily have to be formed.

In the first embodiment, the light guiding plate and the rim portion are not easily misaligned since the tip of the protrusion of the light guiding plate is in contact with the interior lateral face of the rim portion. Further, a space is provided between the lateral surface of the light guiding plate and the interior lateral face of the rim portion, and this makes it possible to inject the adhesive into the space, to prevent the adhesive from being unevenly distributed, and to harden the adhesive with certainty. This results in being able to firmly and stably fix the light guiding plate to the rim portion with certainty using the adhesive. Furthermore, the provision of the space results in stabilizing an amount of the adhesive to be used, and in being able to improve the strength of bonding of the light guiding plate and the rim portion. Moreover, the light guiding plate and the rim portion are not easily misaligned since the tip of the protrusion of the light guiding plate is in contact with the interior lateral face of the rim portion. Further, when the light guiding plate and the rim portion are aligned with each other, the tip of the protrusion is moderately deformed. This results in preventing a body of the light guiding plate from being deformed due to stress from the rim portion. This makes it possible to enhance light guiding characteristics of the light guiding plate. Here, the light guiding characteristics refer to a modulation transfer function (MTF) and the light guiding efficiency of the light guiding plate. Further, the light guiding plate can be obtained by stamping, and this makes it possible to reduce costs for manufacturing the optical member.

Modifications of the optical member of the first embodiment are described below.

Figure 4A:
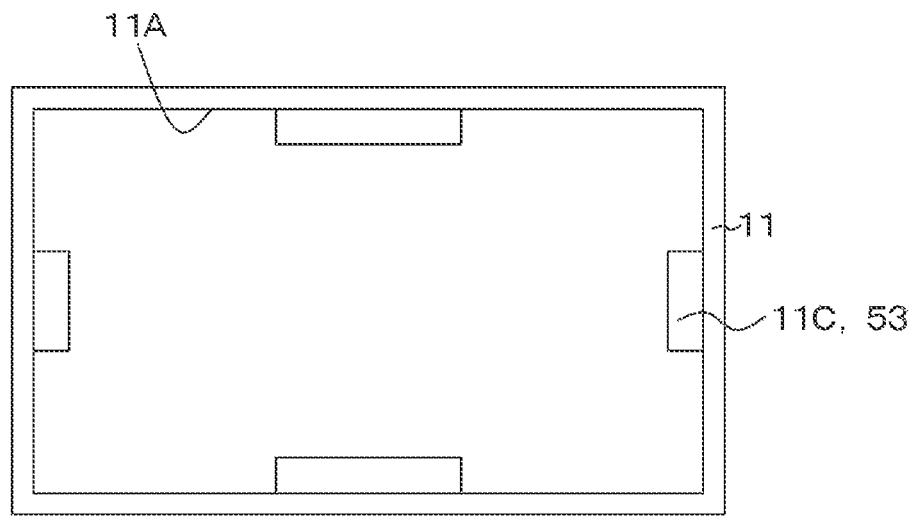
FIG. 4A is a schematic plan view of the rim portion of a first modification of the first embodiment, as viewed from the side opposite to the side of the observer.
Figure 4B:
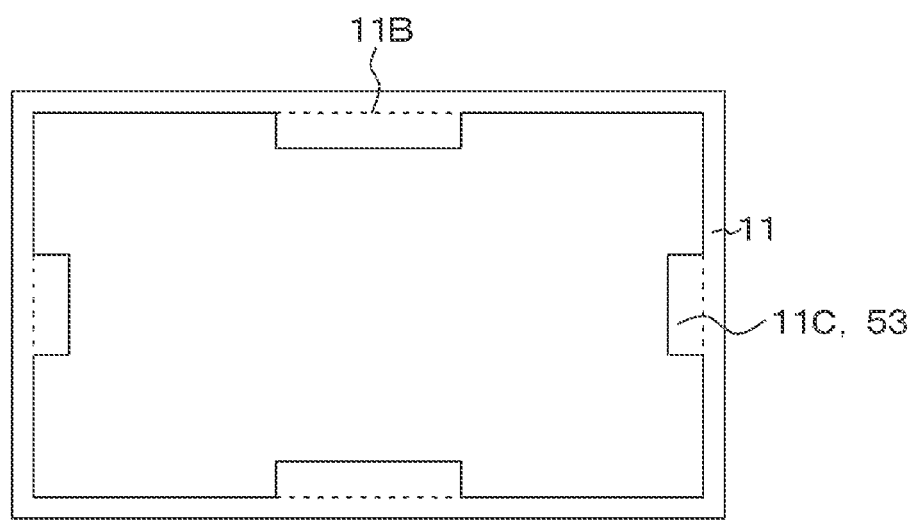
FIG. 4B is a schematic plan view of the rim portion, as viewed from the side of the observer.
Figure 5A:
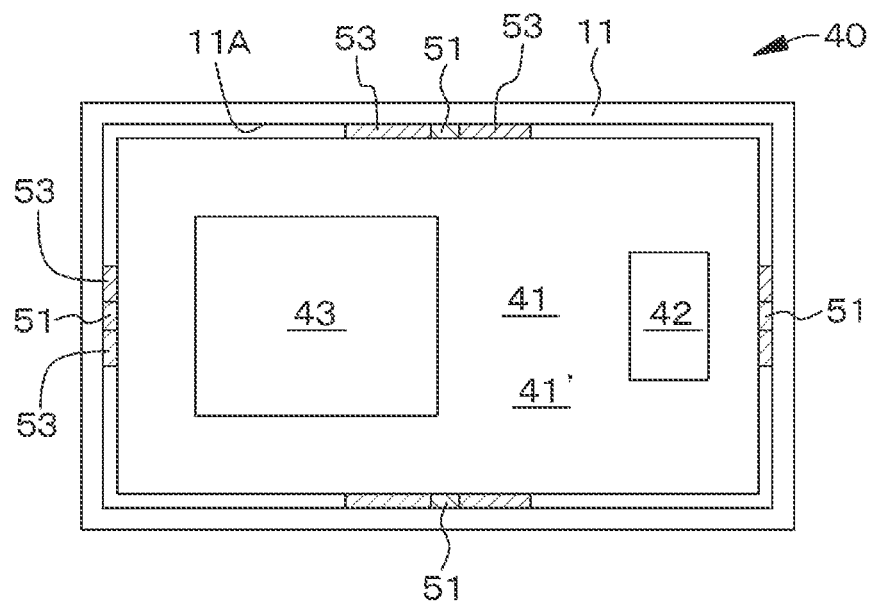
FIG. 5A schematically illustrates the arrangement of the rim portion, the light guiding plate, the first deflection mechanism, and the second deflection mechanism of the first modification of the first embodiment, as viewed from the side opposite to the side of the observer.
Figure 5B:
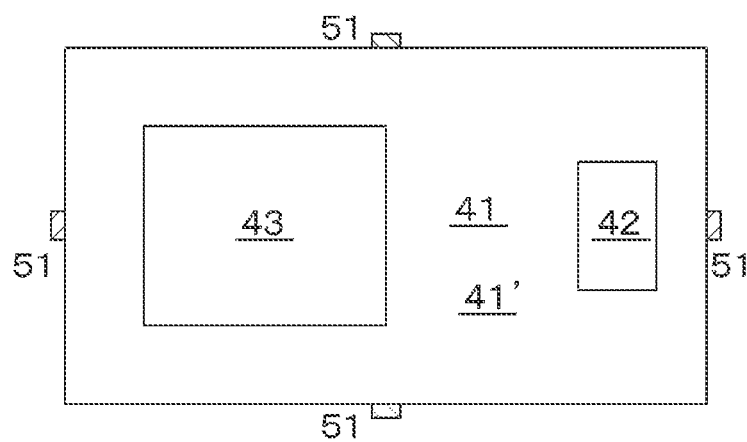
FIG. 5B is a schematic plan view of, for example, the light guiding plate.
Figure 6A:
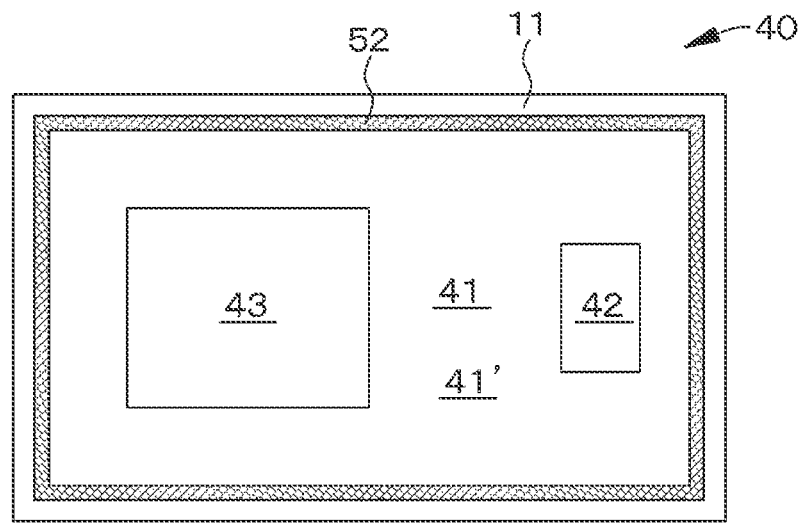
FIGS. 6A and 6B each schematically illustrate the arrangement of the rim portion, the adhesive, the light guiding plate, the first deflection mechanism, and the second deflection mechanism of the first modification of the first embodiment, as viewed from the side opposite to the side of the observer.
Figure 6B:
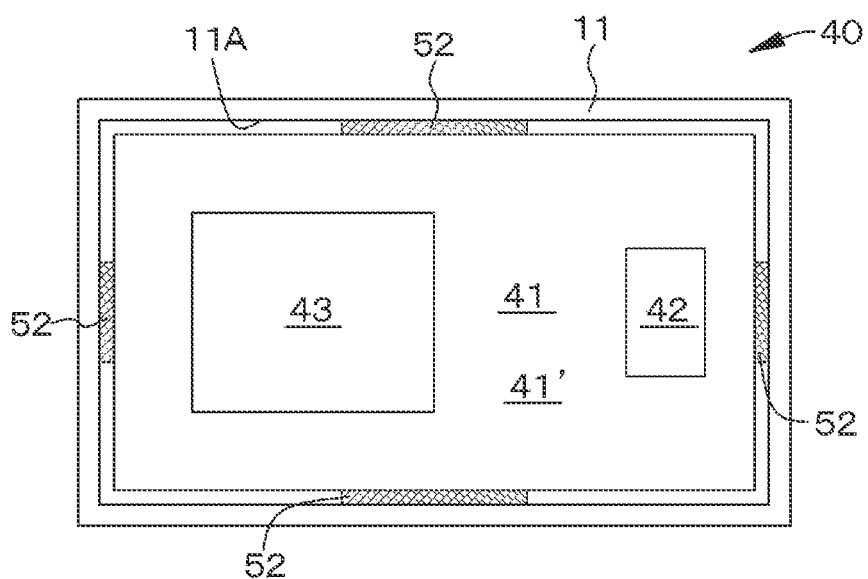

FIG. 4A is a schematic plan view of the rim portion of a first modification of the first embodiment, as viewed from the side opposite to the side of the observer, FIG. 4B is a schematic plan view of the rim portion, as viewed from the side of the observer, FIG. 5A schematically illustrates the arrangement of the rim portion, the light guiding plate, the first deflection mechanism, and the second deflection mechanism of the first modification of the first embodiment, as viewed from the side opposite to the side of the observer, and FIG. 5B is a schematic plan view of, for example, the light guiding plate. Further, FIGS. 6A and 6B each schematically illustrate the arrangement of the rim portion, the adhesive, the light guiding plate, the first deflection mechanism, and the second deflection mechanism of the first modification of the first embodiment, as viewed from the side opposite to the side of the observer.

In the first modification of the first embodiment, the light-guiding-plate receiving portion 53 is provided to the rim portion 11 to face a portion of the outer peripheral portion of the light guiding plate 41. In other words, for example, the light-guiding-plate receiving portion 53 may be provided to a middle portion of a long side of the light guiding plate 41, or to a middle portion of a short side of the light guiding plate 41, or, as illustrated in FIGS. 4A and 4B, the light-guiding-plate receiving portion 53 may be provided to the middle portions of the long side and the short side of the light guiding plate 41. It is sufficient if the light-guiding-plate receiving portion 53 has a length of 1 mm or greater in order to fix the light guiding plate with certainty. Although it depends on characteristics (specifically, viscosity) of the adhesive 52 to be used, all of the periphery of the light guiding plate 41 may be fixed to the interior lateral face 11A of the rim portion 11 using the adhesive 52 (refer to FIG. 6A), or a portion of the light guiding plate 41 may be fixed to the interior lateral face 11A of the rim portion 11 using the adhesive 52. Specifically, a portion provided with the projecting portion 11C (and a region around the portion) may be fixed to the interior lateral face 11A of the rim portion 11 using the adhesive 52 (refer to FIG. 6B). In other words, all of the periphery of the light guiding plate 41 is fixed to the interior lateral face 11A of the rim portion 11 using the adhesive 52 in FIG. 6A, and a portion of the light guiding plate 41 is fixed to the interior lateral face 11A of the rim portion 11 using the adhesive 52 in FIG. 6B. The length of the portion of the light guiding plate, which is fixed to the interior lateral face 11A of the rim portion 11 using the adhesive 52, is set to be, for example, a length of 60% of all of the periphery of the light guiding plate 41. However, the length is not limited to this value. In the first modification of the first embodiment, the adhesive 52 can be hardened from a side of the first surface of the light guiding plate 41 and from the side of the second surface of the light guiding plate 41. This makes it possible to further improve the bonding strength and to further increase the mass productivity.

Figure 7A:
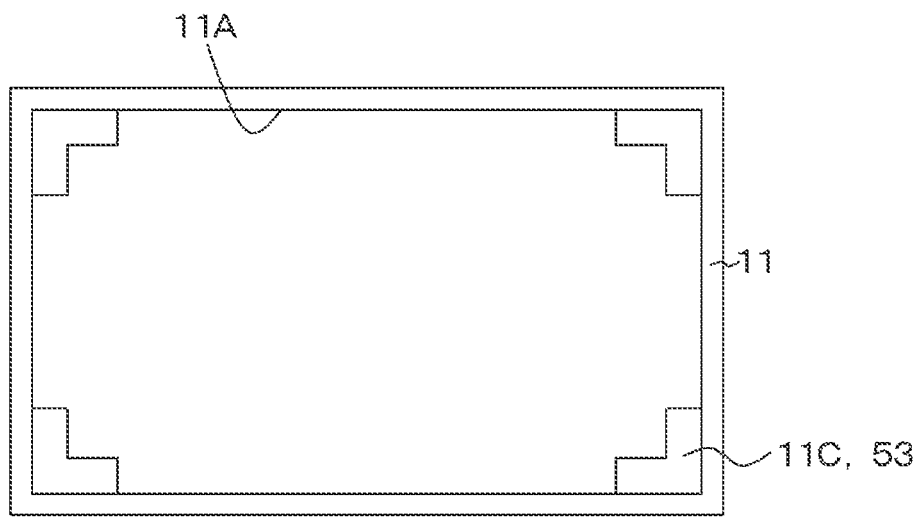
FIG. 7A is a schematic plan view of the rim portion of a second modification of the first embodiment, as viewed from the side opposite to the side of the observer.
Figure 7B:
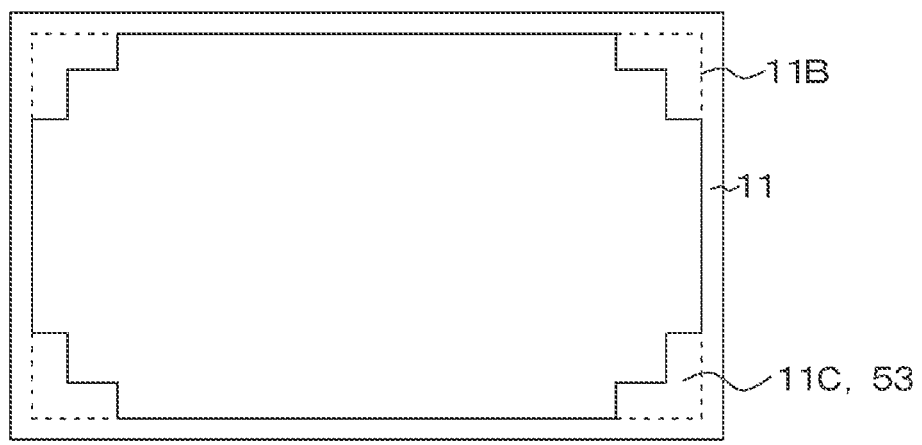
FIG. 7B is a schematic plan view of the rim portion, as viewed from the side of the observer.
Figure 8A:
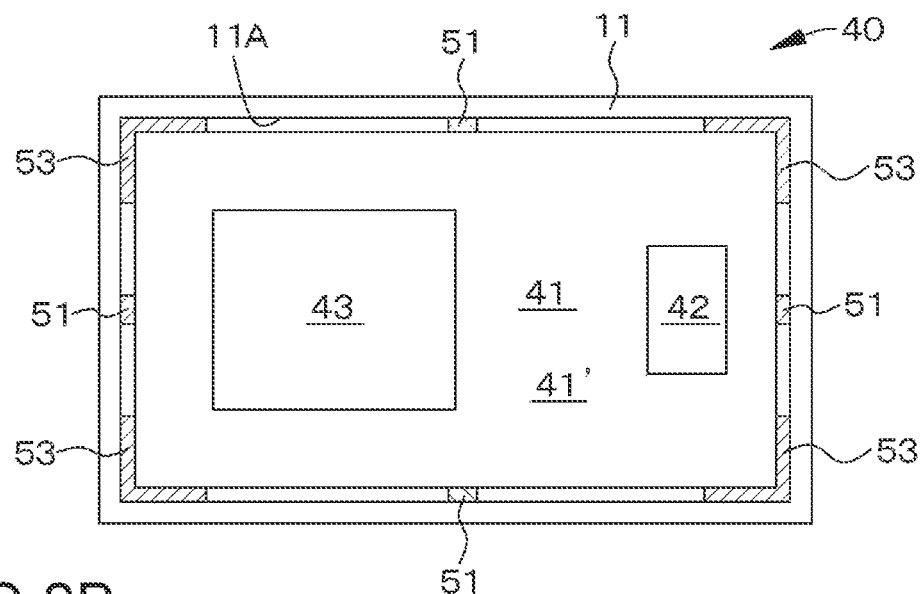
FIG. 8A schematically illustrates the arrangement of the rim portion, the light guiding plate, the first deflection mechanism, and the second deflection mechanism of the second modification of the first embodiment, as viewed from the side opposite to the side of the observer.
Figure 8B:
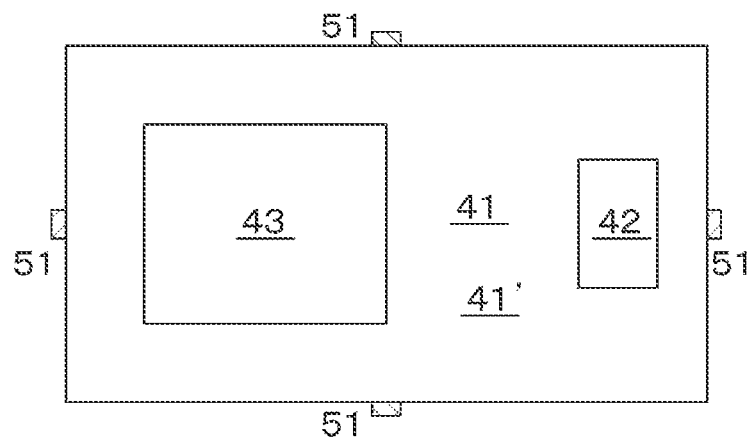
FIG. 8B is a schematic plan view of, for example, the light guiding plate.
Figure 9A:
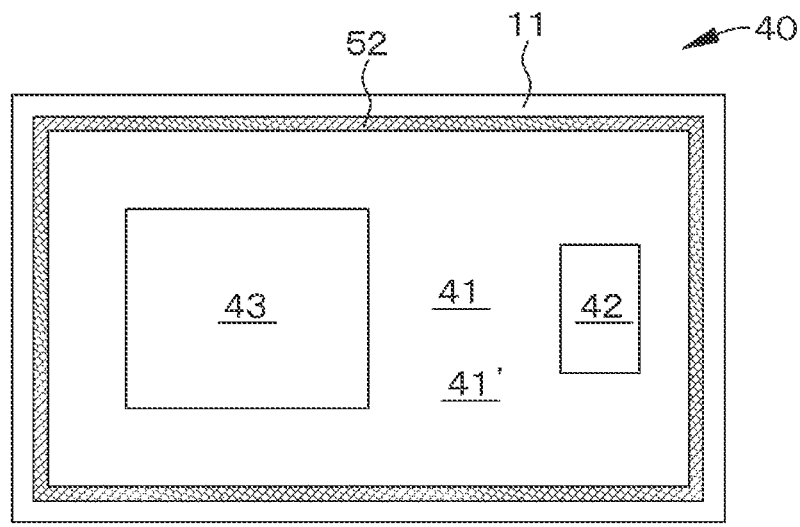
FIGS. 9A and 9B each schematically illustrate the arrangement of the rim portion, the adhesive, the light guiding plate, the first deflection mechanism, and the second deflection mechanism of the second modification of the first embodiment, as viewed from the side opposite to the side of the observer.
Figure 9B:
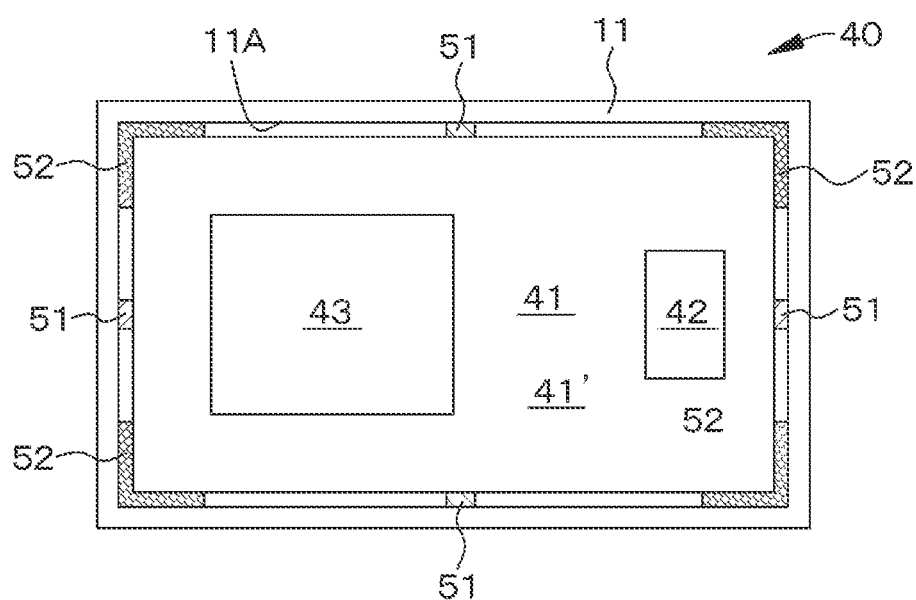

FIG. 7A is a schematic plan view of the rim portion of a second modification of the first embodiment, as viewed from the side opposite to the side of the observer, and FIG. 7B is a schematic plan view of the rim portion, as viewed from the side of the observer. Further, FIG. 8A schematically illustrates the arrangement of the rim portion, the light guiding plate, the first deflection mechanism, and the second deflection mechanism of the second modification of the first embodiment, as viewed from the side opposite to the side of the observer, FIG. 8B is a schematic plan view of, for example, the light guiding plate, and FIGS. 9A and 9B each schematically illustrate the arrangement of the rim portion, the adhesive, the light guiding plate, the first deflection mechanism, and the second deflection mechanism of the second modification of the first embodiment, as viewed from the side opposite to the side of the observer.

In the second modification of the first embodiment, the light-guiding-plate receiving portion 53 is provided to a corner portion of the light guiding plate 41. It is sufficient if the light-guiding-plate receiving portion 53 has a length of 1 mm or greater in order to fix the light guiding plate with certainty. Although it depends on characteristics (specifically, viscosity) of the adhesive 52 to be used, all of the periphery of the light guiding plate 41 may be fixed to the interior lateral face 11A of the rim portion 11 using the adhesive 52 (refer to FIG. 9A), or a portion of the light guiding plate 41 may be fixed to the interior lateral face 11A of the rim portion 11 using the adhesive 52. Specifically, a portion provided with the projecting portion 11C (and a region around the portion) may be fixed to the interior lateral face 11A of the rim portion 11 using the adhesive 52 (refer to FIG. 9B). In other words, all of the periphery of the light guiding plate 41 is fixed to the interior lateral face 11A of the rim portion 11 using the adhesive 52 in FIG. 9A, and a portion of the light guiding plate 41 is fixed to the interior lateral face 11A of the rim portion 11 using the adhesive 52 in FIG. 9B. The length of the portion of the light guiding plate, which is fixed to the interior lateral face 11A of the rim portion 11 using the adhesive 52, is set to be, for example, a length of 60% of all of the periphery of the light guiding plate 41. However, the length is not limited to this value. Also in the second modification of the first embodiment, the adhesive 52 can be hardened from the side of the first surface of the light guiding plate 41 and from the side of the second surface of the light guiding plate 41. This makes it possible to further improve the bonding strength and to further increase the mass productivity.

Figure 10A:
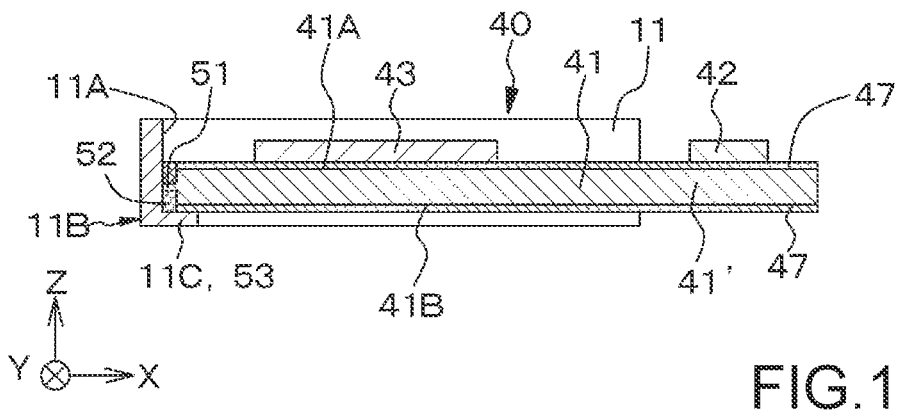
FIG. 10A is a schematic cross-sectional view of the optical apparatus of a third modification of the first embodiment.
Figure 10B:
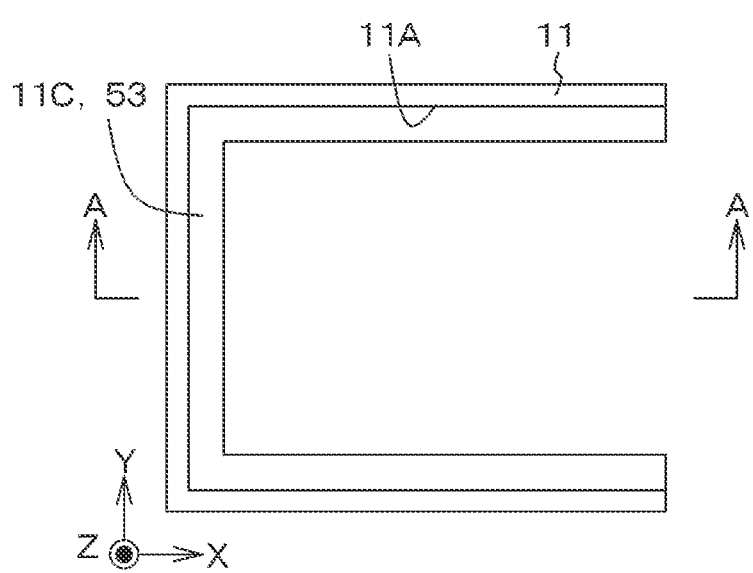
FIG. 10B is a schematic plan view of the rim portion of the third modification of the first embodiment, as viewed from the side opposite to the side of the observer.
Figure 10C:
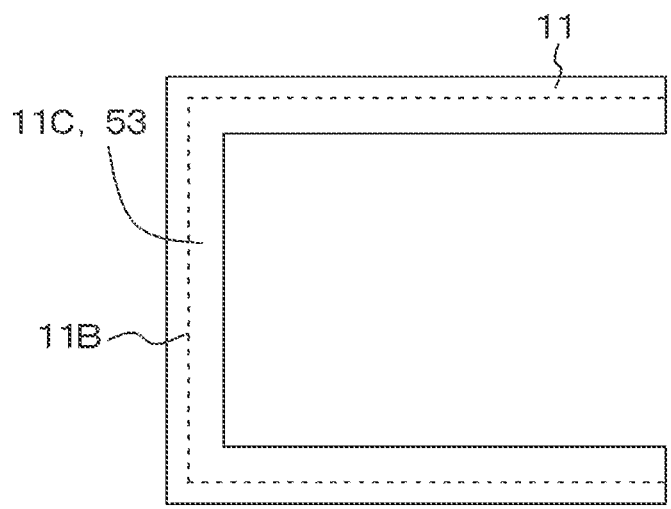
FIG. 10C is a schematic plan view of the rim portion, as viewed from the side of the observer.
Figure 11A:
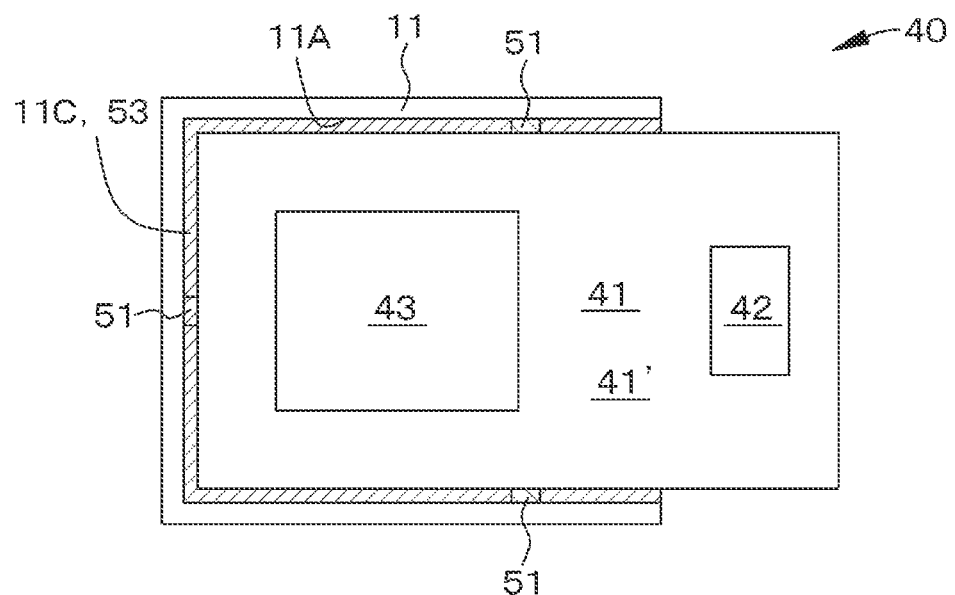
FIG. 11A schematically illustrates the arrangement of the rim portion, the light guiding plate, the first deflection mechanism, and the second deflection mechanism of the third modification of the first embodiment, as viewed from the side opposite to the side of the observer.
Figure 11B:
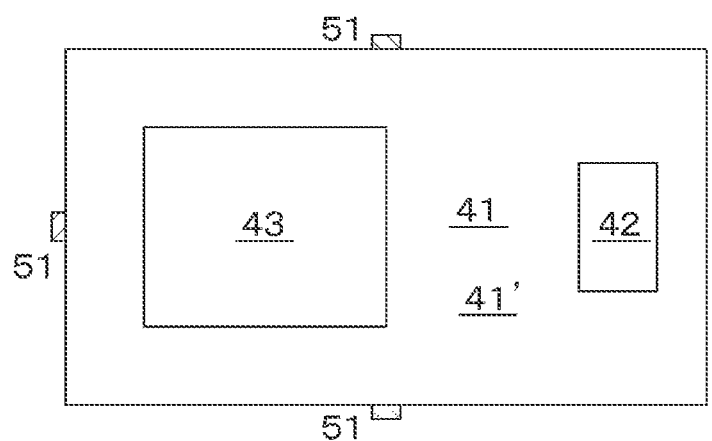
FIG. 11B is a schematic plan view of, for example, the light guiding plate.
Figure 12A:
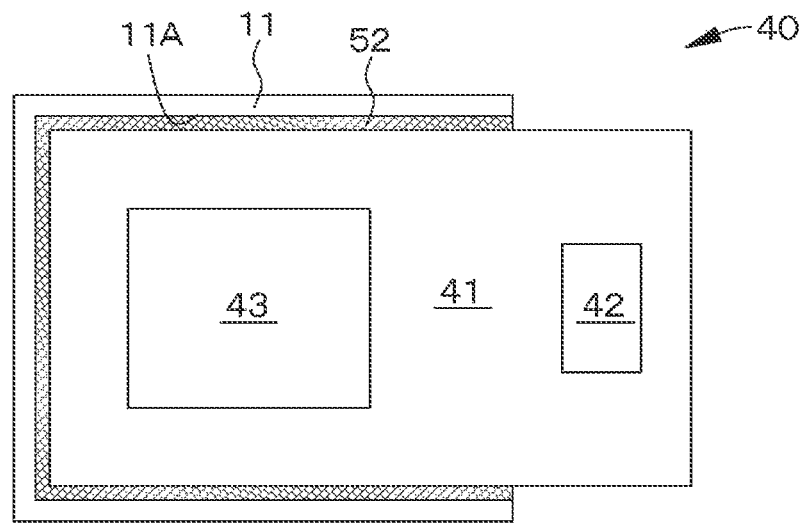
FIGS. 12A and 12B each schematically illustrate the arrangement of the rim portion, the adhesive, the light guiding plate, the first deflection mechanism, and the second deflection mechanism of the third modification of the first embodiment, as viewed from the side opposite to the side of the observer.
Figure 12B:
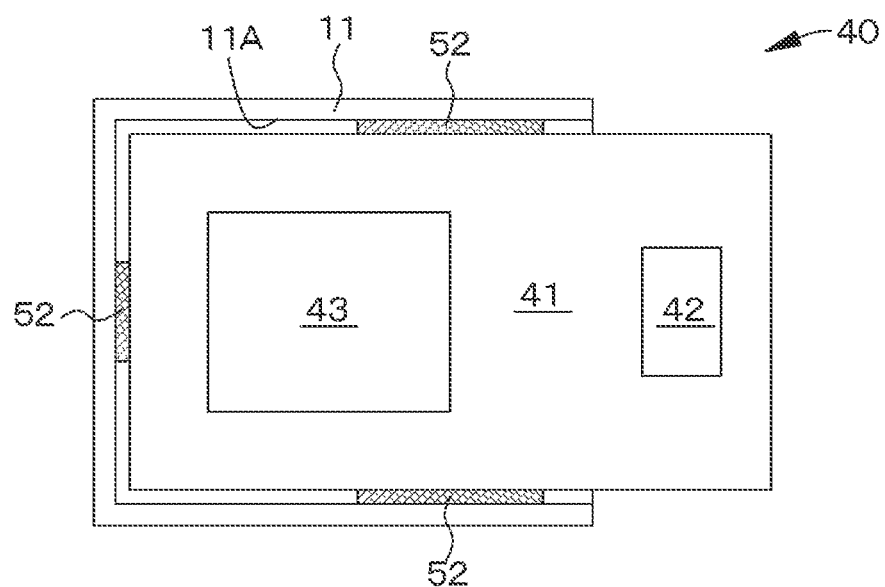

FIG. 10A is a schematic cross-sectional view of the optical apparatus of a third modification of the first embodiment, FIG. 10B is a schematic plan view of the rim portion of the third modification of the first embodiment, as viewed from the side opposite to the side of the observer, and FIG. 10C is a schematic plan view of the rim portion, as viewed from the side of the observer. Further, FIG. 11A schematically illustrates the arrangement of the rim portion, the light guiding plate, the first deflection mechanism, and the second deflection mechanism of the third modification of the first embodiment, as viewed from the side opposite to the side of the observer, FIG. 11B is a schematic plan view of, for example, the light guiding plate, and FIGS. 12A and 12B each schematically illustrate the arrangement of the rim portion, the adhesive, the light guiding plate, the first deflection mechanism, and the second deflection mechanism, as viewed from the side opposite to the side of the observer. All of the periphery of the light guiding plate 41 is fixed to the interior lateral face 11A of the rim portion 11 using the adhesive 52 in FIG. 12A, and a portion of the light guiding plate 41 is fixed to the interior lateral face 11A of the rim portion 11 using the adhesive 52 in FIG. 12B. In the third modification of the first embodiment, the rim portion 11 surrounds a portion of the light guiding plate 41. This makes it possible to make the entirety of the optical member lighter, to improve a degree of freedom in a design of an appearance of the optical member, and to enhance the aesthetic appearance of the optical member.

Note that the first or second modification of the first embodiment can also be applied to the third modification of the first embodiment.

Second Embodiment

A second embodiment relates to the optical member manufacturing method of the present disclosure and the stamping apparatus of the present disclosure.

Figure 15A:
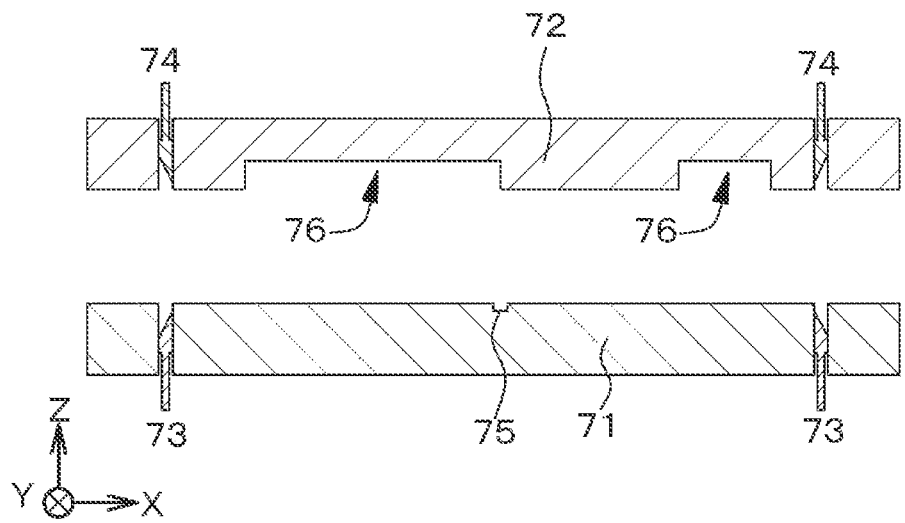
FIG. 15A schematically illustrates a portion of an end surface of a stamping apparatus used to manufacture the optical member of the first embodiment.

As illustrated in a conceptual diagram of FIG. 15A, the stamping apparatus of the second embodiment is a stamping apparatus used to manufacture the optical member 40 described in the first embodiment, the stamping apparatus including

- an on-placement base (an on-placement stage) 71 on which the resin plate 41' provided with the first deflection mechanism 42 and the second deflection mechanism 43 is placed,
- a fixation base (a fixation stage) 72 that fixes, to the on-placement base, the resin plate 41' provided with the first deflection mechanism 42 and the second deflection mechanism 43,
- a lower blade 73 used to perform stamping on the resin plate 41', and
- an upper blade 74 used to perform stamping on the resin plate 41'.

The stamping apparatus of the second embodiment further includes

- an alignment reference point 75 that is provided to the on-placement base 71, and
- an alignment mechanism that aligns the first deflection mechanism 42 or the second deflection mechanism 43 with the alignment reference point 75 to control a relationship in relative position between the on-placement base 71 and a direction horizontal to the lower blade and the upper blade. Further, a specified space may be formed between the lower blade 73 and the upper blade 74 upon performing stamping on the resin plate 41'. Note that, when there is a need to provide a protrusion (specifically, a protrusion in the form of a burr) to a specific region in the light guiding plate 41, a space between the lower blade 73 and the upper blade 74 that corresponds to the specific region may be made larger than a space between the lower blade 73 and the upper blade 74 in a region other than the specific region. Further, a concave portion 76 is formed in a portion, in the on-placement base 71 or the fixation base 72 (specifically, the fixation base 72 in the second embodiment), that faces the deflection mechanism 42, 43, and the deflection mechanism 42, 43 and the on-placement base 71 or the fixation base 72 (specifically, the fixation base 72 in the second embodiment) are out of contact with each other.

The alignment mechanism includes a camera (not illustrated), where the alignment reference point 75 is in the field of view of the camera. Further, an image of the alignment reference point 75 and the deflection mechanism (for example, the second deflection mechanism 43) is captured using the camera, a positional relationship between the deflection mechanism and the alignment reference point 75 is obtained, and, using a movement mechanism (not illustrated), the resin plate 41' is moved in an XY direction to be situated at a desired location. The fixation base 72 is moved downward and moved upward with respect to the on-placement base 71 using a first movement mechanism (not illustrated). The lower blade 73 is moved upward and moved downward with respect to the on-placement base 71 using a second movement mechanism (not illustrated). The upper blade 74 is moved downward and moved upward with respect to the fixation base 72 using a third movement mechanism (not illustrated). When the first deflection mechanism 42 and the second deflection mechanism 43 are not misaligned, the alignment mechanism enables the deflection mechanism and the lower and upper blades 73 and 74 to have a specified positional relationship on the basis of a positional relationship between the deflection mechanism and the alignment reference point 75. In other words, even if the deflection mechanism is arranged in a state of being misaligned with the resin plate 41' on which stamping has not been performed, the deflection mechanism can be arranged at a prescribed position with respect to the lower and upper blades 73 and 74. In other words, the deflection mechanism 42, 43 does not necessarily have to be arranged at an accurate position in the resin plate 41' on which stamping has not been performed. This makes it possible to reduce manufacturing costs.

As described above, the stamping apparatus holds the resin plate 41' such that the resin plate 41' is sandwiched between the on-placement base 71 and the fixation base 72 upon performing stamping. This makes it possible to prevent the resin plate 41' from being deformed upon performing stamping, and thus to keep the light guiding characteristics of the light guiding plate 41 at a high level. Further, upon performing stamping, force is equally applied to the resin plate 41' from below and from above using the lower blade 73 and the upper blade 74. This makes it possible to prevent the resin plate 41' from being deformed upon performing stamping, and thus to keep the light guiding characteristics of the light guiding plate 41 at a high level. Furthermore, the stamping apparatus includes the alignment mechanism aligning the first or second deflection mechanism 42 or 43 provided on the resin plate 41' with the alignment reference point 75 provided to the on-placement base 71. This makes it possible to relax the accuracy in positioning the first deflection mechanism 42 and the second deflection mechanism 43 with respect to the resin plate 41' on which stamping has not been performed. This results in being able to manufacture the optical member at low costs. Moreover, the formation of the concave portion 76 makes it possible to prevent the first deflection mechanism 42 and the second deflection mechanism 43 from being damaged or deteriorated, and thus to keep the light guiding characteristics of the light guiding plate 41 at a high level.

The optical member manufacturing method of the second embodiment, which is performed to manufacture the optical member described in the first embodiment, is described below.

[Process-200]

Figure 16A:
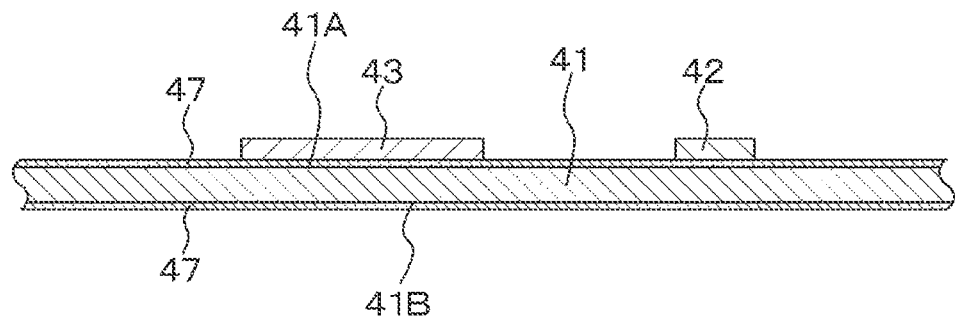
FIGS. 16A, 16B, and 16C are schematic diagrams of a portion of an end surface of the resin plate and the like, and the portion of the end surface of the stamping apparatus, the schematic diagrams being used to describe a method for manufacturing the optical member of the first embodiment.

First, the resin plate 41' provided with the first deflection mechanism 42 and the second deflection mechanism 43 is provided. Specifically, the resin plate 41' is formed by injection molding using cycloolefin copolymer (COP). The size of the resin plate 41' is, for example, 90 mm×50 mm×1.0 mm. Cycloolefin copolymer is highly fluent (melt flow rate) upon performing injection molding, and this makes it possible to perform injection molding with a low injection pressure. Further, this results in residual stresses being less likely to remain in the resin plate 41'. Consequently, the resin plate 41' exhibits excellent optical characteristics. Next, the hard coat layer 47 is formed by dipping on a front surface of the resin plate 41'. Then, the first deflection mechanism 42 and the second deflection mechanism 43 are bonded to the resin plate 41'. Accordingly, a structure illustrated in FIG. 16A can be obtained.

[Process-210]

Figure 16B:
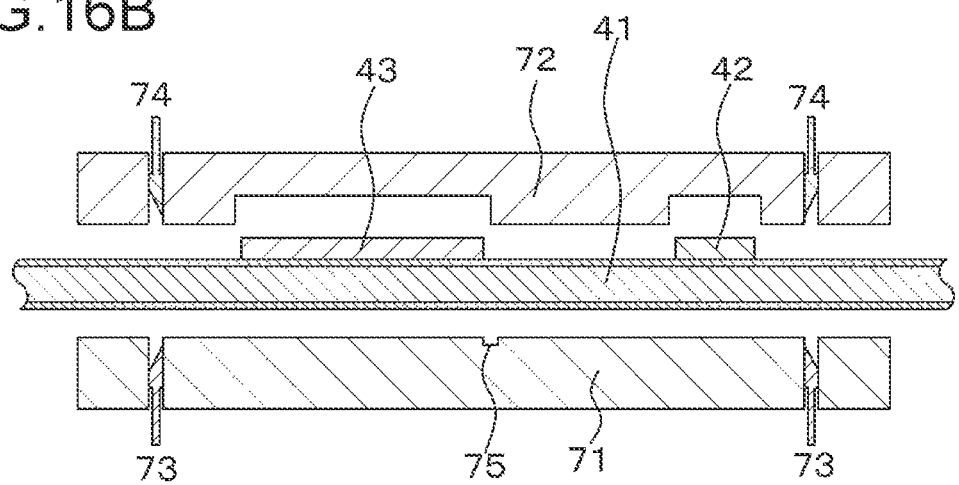
Figure 16C:
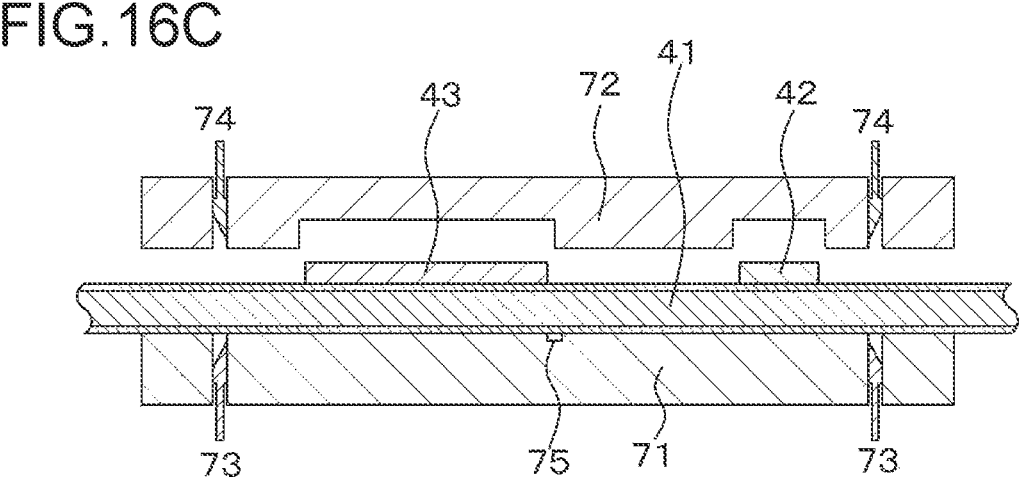
Figure 17A:
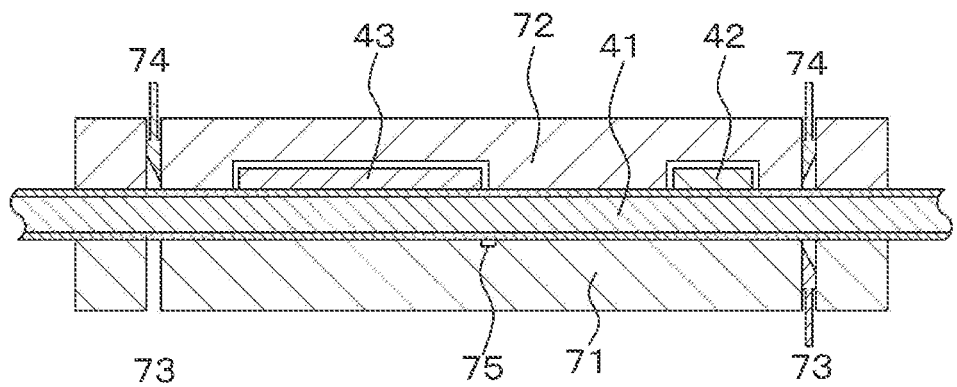
FIGS. 17A, 17B, and 17C are schematic diagrams of the portion of the end surface of the resin plate and the like, and the portion of the end surface of the stamping apparatus, the schematic diagrams being subsequent to FIG. 16C and used to describe the method for manufacturing the optical member of the first embodiment.

Then, stamping is performed on the resin plate 41', and the light guiding plate 41 having a desired outer shape and including the protrusion (specifically, a protrusion in the form of a burr) 51 extending from a portion of the lateral surface of the light guiding plate 41 is obtained. Specifically, first, the resin plate 41' (the resin plate 41' provided with the first deflection mechanism 42 and the second deflection mechanism 43) obtained in [Process-200] is placed on the on-placement base 71 of the stamping apparatus (refer to FIGS. 16B and 16C). Then, the fixation base 72 is moved downward to fix, to the on-placement base 71, the resin plate 41' provided with the first deflection mechanism 42 and the second deflection mechanism 43 (refer to FIG. 17A).

Here, the concave portion 76 is formed in a portion, in the on-placement base 71 or the fixation base 72 (specifically, the fixation base 72 in the second embodiment), that faces the deflection mechanism 42, 43, and the deflection mechanism 42, 43 and the on-placement base 71 or the fixation base 72 (specifically, the fixation base 72 in the second embodiment) are out of contact with each other.

[Process-210A]

Figure 15B:
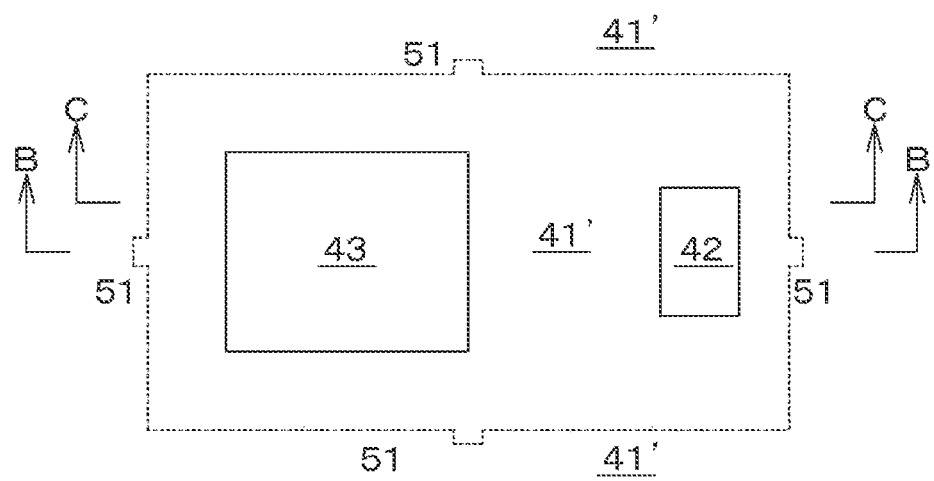
FIG. 15B is a schematic plan view of a resin plate on which stamping has not been performed.
Figure 17B:
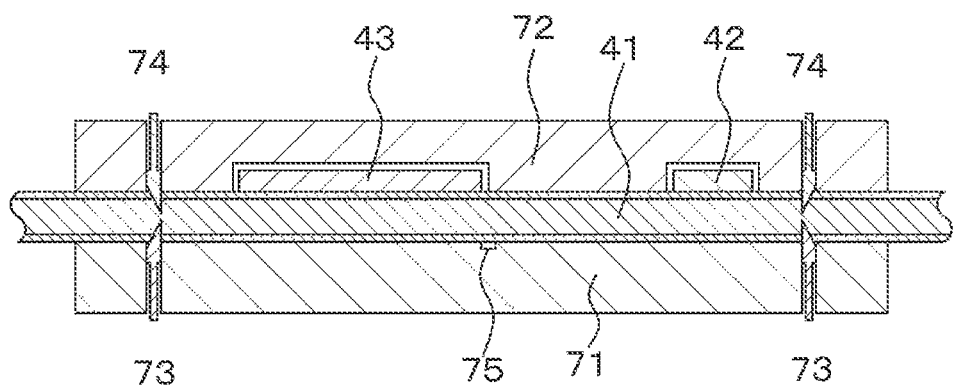
Figure 17C:
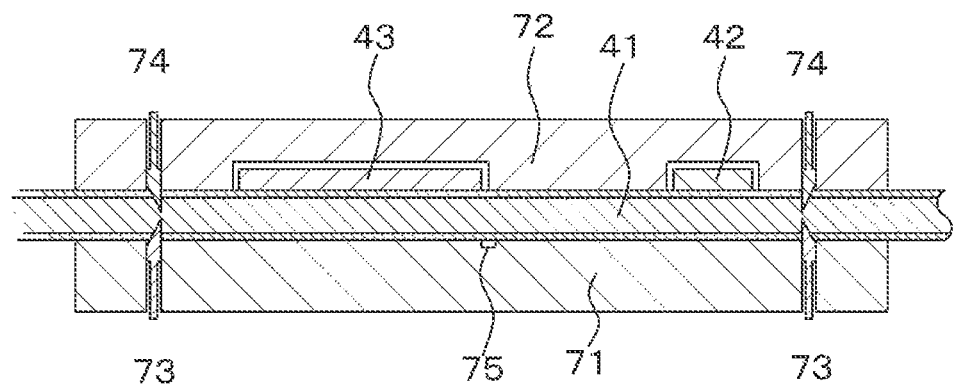

Thereafter, the lower blade 73 is moved upward, and the upper blade 74 is moved downward (refer to FIGS. 17B and 17C). Note that FIG. 17B is a schematic diagram of a portion of an end surface along an arrow B-B in FIG. 15B, and FIG. 17C is a schematic diagram of a portion of an end surface along an arrow C-C in FIG. 15B. Accordingly, an outer shape process that is specifically stamping is performed on the resin plate 41', and the protrusion (specifically, a protrusion in the form of a burr) 51 is formed. FIG. 15B is a schematic plan view of the resin plate 41' on which stamping has not been performed, where a region that is included in the resin plate 41' and with which the lower blade 73 and the upper blade 74 are brought into contact is schematically indicated by dotted lines. Upon performing the stamping on the resin plate 41' illustrated in FIGS. 17B and 17C, position adjustment is performed on the lower blade 73 and the upper blade 74 such that a space of, for example, from 0.05 mm to 0.20 mm is formed between the lower blade 73 and the upper blade 74 as a specified space. Since the hard coat layer 47 does not exist in a cut portion of the resin plate 41', the tip of the protrusion and the interior lateral face of the rim portion can be bonded with a high strength using the adhesive.

[Process-210B]

Figure 18A:
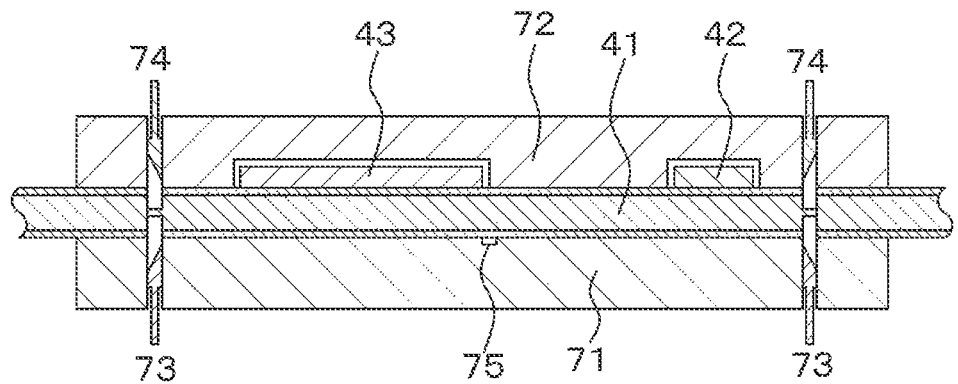
FIGS. 18A, 18B, and 18C are schematic diagrams of the portion of the end surface of the resin plate and the like, and the portion of the end surface of the stamping apparatus, the schematic diagrams being subsequent to FIGS. 17B and 17C and used to describe the method for manufacturing the optical member of the first embodiment.
Figure 18B:
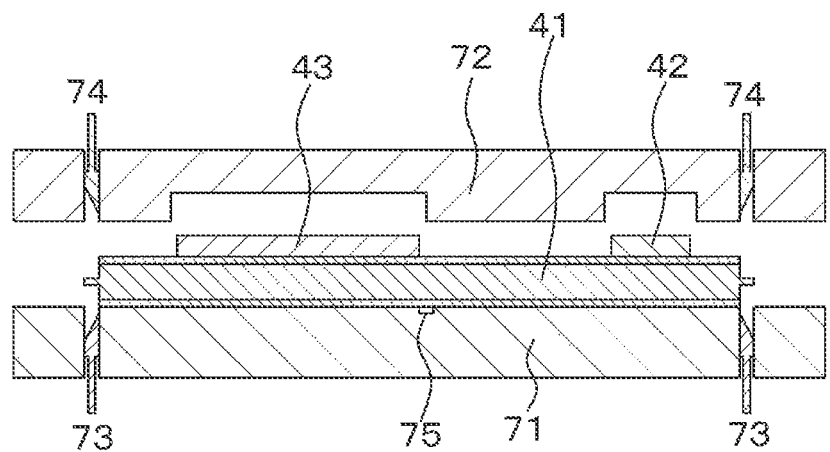

Next, the lower blade 73 is moved downward, and the upper blade 74 is moved upward (refer to FIG. 18A). Further, the fixation base 72 is moved upward (refer to FIG. 18B). Accordingly, the light guiding plate 41 (the resin plate 41') having a desired outer shape and including the protrusion (specifically, a protrusion in the form of a burr) 51 extending from a portion of the lateral surface of the light guiding plate 41 can be obtained. Here, when a space between the lower blade 73 and the upper blade 74, or movement speeds of these blades 73 and 74 are adjusted, this makes it possible to change the thickness t1 or the height H1 of the protrusion 51. Further, the thickness t1 and the height H1 are also changed according to a change including a change over time in shapes of the lower blade 73 and the upper blade 74.

[Process-220]

Figure 18C:
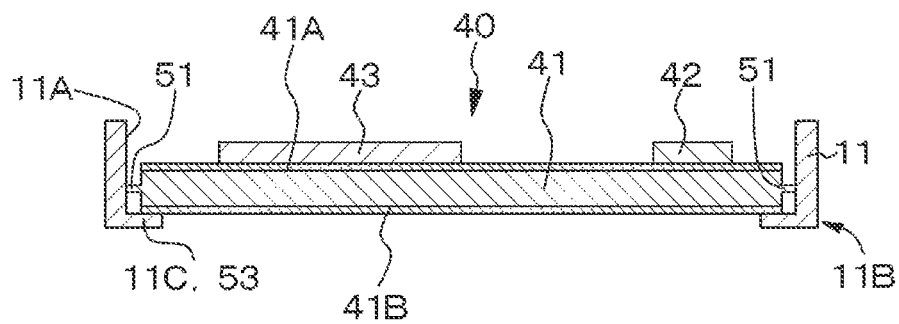

The light guiding plate 41 (the resin plate 41') obtained as described above is arranged in the rim portion 11 (refer to FIG. 18C). The tip of the protrusion 51 of the light guiding plate 41 is in contact with the interior lateral face 11A of the rim portion 11, and a space is formed between the lateral surface of the light guiding plate 41 and the interior lateral face 11A of the rim portion 11. Then, the ultraviolet curable adhesive 52 is injected into the space. Next, the adhesive 52 is irradiated with ultraviolet rays to be hardened. This makes it possible to firmly fix the light guiding plate 41 to the rim portion 11 with certainty using the adhesive 52. Furthermore, the provision of the space results in stabilizing an amount of the adhesive 52 to be used, and in being able to improve the strength of bonding of the light guiding plate 41 and the rim portion 11. Moreover, the light guiding plate 41 and the rim portion 11 are not easily misaligned since the tip of the protrusion 51 of the light guiding plate 41 is in contact with the interior lateral face 11A of the rim portion 11. Further, when the light guiding plate 41 and the rim portion 11 are aligned with each other, the tip of the protrusion 51 is moderately deformed. This results in preventing a body of the light guiding plate 41 from being deformed due to stress from the rim portion 11. Accordingly, the optical member of the first embodiment illustrated in, for example, FIG. 1A can be obtained.

Note that, instead of stamping, cutting can be adopted as the outer shape process. In the case of the cutting, alignment is performed on the basis of the first deflection mechanism 42 or the second deflection mechanism 43 to perform cutting, and this makes it possible to relax the accuracy in positioning the first deflection mechanism 42 and the second deflection mechanism 43 with respect to the resin plate 41' on which stamping has not been performed. This results in being able to manufacture the optical member at low costs.

Third Embodiment

Figure 19:
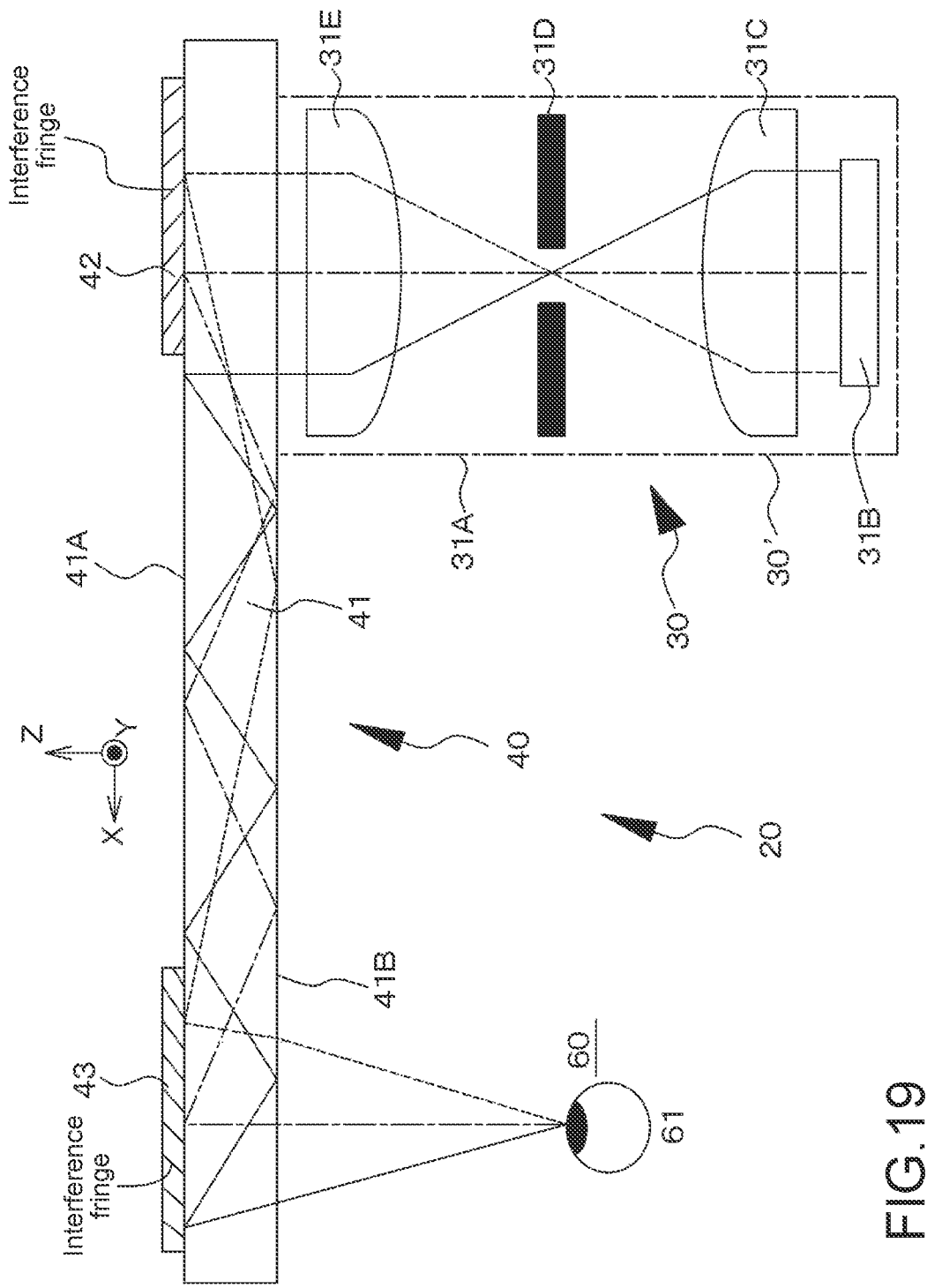
FIG. 19 schematically illustrates the arrangement of an image forming apparatus and the optical member being included in the display apparatus of a third embodiment.

In the third to fifth embodiments, the image forming apparatus and the optical member are described. In the third embodiment, the image forming apparatus and the optical member that are included in the display apparatus described in the first embodiment are described. FIG. 19 schematically illustrates the arrangement of the image forming apparatus and the optical member.

In the display apparatus of the third embodiment, specifically, the first deflection mechanism 42 and the second deflection mechanism 43 are arranged on (specifically, bonded to) the surface of the light guiding plate 41 (specifically, the first surface 41A of the light guiding plate 41). Further, light that enters the light guiding plate 41 is diffractively reflected off the first deflection mechanism 42, and the light being totally reflected within the light guiding plate 41 to propagate through the light guiding plate 41 is diffractively reflected off the second deflection mechanism 43. As described above, the first deflection mechanism 42 and the second deflection mechanism 43 each include a diffraction grating member that is specifically a reflective diffraction grating member, and more specifically a reflective volume-hologram diffraction grating member. The first deflection mechanism including a hologram diffraction grating member is hereinafter referred to as a "first diffraction grating member 42" for convenience, and the second deflection mechanism including a hologram diffraction grating member is hereinafter referred to as a "second diffraction grating member 43" for convenience. Note that the hard coat layer 47 is not illustrated in FIGS. 19, 21, 22, 23, 25, and 26. The hard coat layer 47 may be formed, or the hard coat layer 47 does not necessarily have to be formed, as illustrated in the figures.

Further, in the third embodiment, or in the fourth embodiment described later, the first diffraction grating member 42 and the second diffraction grating member 43 each include a single diffraction grating layer. An interference fringe that corresponds to one type of wavelength band (or wavelength) is formed in each diffraction grating layer made of a photopolymer material, and the diffraction grating layer is produced by a conventional method. A pitch of an interference fringe formed in a diffraction grating layer (a diffraction optical element) is constant, and the interference fringes are linear and extend in parallel with a Y direction. The first diffraction grating member 42 and the second diffraction grating member 43 each have an axis extending in parallel with an X direction, and a normal line extending in parallel with a Z direction.

Figure 20A:
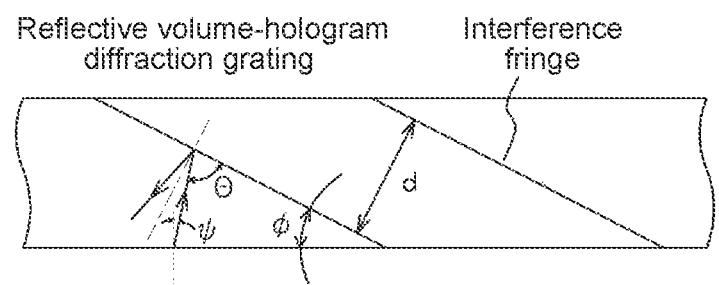
FIG. 20A is a schematic cross-sectional view of an enlarged portion of a reflective volume-hologram diffraction grating film, and FIG. 20B schematically illustrates the image forming apparatus included in a modification of the display apparatus of the third embodiment.

FIG. 20A is a schematic cross-sectional view of an enlarged portion of a reflective volume-hologram diffraction grating member. An interference fringe that has an angle of inclination (a slant angle) $\varphi$ is formed in the reflective volume-hologram diffraction grating member. The angle of inclination $\varphi$ refers to an angle formed by an interference fringe and the surface of a reflective volume-hologram diffraction grating member. The interference fringe is formed from the interior of the reflective volume-hologram diffraction grating member to the surface of the reflective volume-hologram diffraction grating member. The interference fringe satisfies the Bragg condition. The Bragg condition refers to a condition that satisfies Formula (A) indicated below. In Formula (A), m is a positive integer, $\lambda$ is a wavelength, d is a pitch of a grating plane (spacing of an imaginary plane including an interference fringe in a normal direction), and $\Theta$ is a complement of an angle at which light enters interference fringes. Further, when light enters a diffraction grating member at an angle of incidence $\psi$, a relationship between $\Theta$, the angle of inclination $\varphi$, and the angle of incidence $\psi$ is represented by Formula (B) indicated below.

$$m \cdot \lambda = 2 \cdot d \cdot \sin(\Theta) \tag{A}$$

$$\Theta = 90° - (\varphi + \psi) \tag{B}$$

As described above, the first diffraction grating member 42 is arranged on (bonded to) the first surface 41A of the light guiding plate 41, and parallel light that enters the light guiding plate 41 from the second surface 41B is diffractively reflected off the first diffraction grating member 42 such that the parallel light entering the light guiding plate 41 is totally reflected within the light guiding plate 41. Further, as described above, the second diffraction grating member 43 is arranged on (bonded to) the first surface 41A of the light guiding plate 41, and the parallel light being totally reflected within the light guiding plate 41 to propagate through the light guiding plate 41 is diffractively reflected off the second diffraction grating member 43, and exits the light guiding plate 41 from the second surface 41B in the form of the parallel light.

Then, parallel light is totally reflected within the light guiding plate 41 to propagate through the light guiding plate 41, and then the parallel light exits the light guiding plate 41. In this case, the number of times that light traveling through the light guiding plate 41 is totally reflected before the light reaches the second diffraction grating member 43 differs depending on the angle of view, since the light guiding plate 41 is thin and a path of the light is long. More specifically, with respect to parallel light that enters the light guiding plate 41, the number of reflections of parallel light that enters the light guiding plate 41 at an angle at which the parallel light enters in a direction of the second diffraction grating member 43, is smaller than the number of reflections of parallel light that enters the light guiding plate 41 at an angle at which the parallel light enters in a direction opposite to the second diffraction grating member 43. The reason is that, when light that propagates through the light guiding plate 41 impinges on an inner face of the light guiding plate 41, the light forms a smaller angle with a normal line of the light guiding plate 41 in the case of parallel light that is diffractively reflected off the first diffraction grating member 42, and enters the light guiding plate 41 at an angle at which the parallel light enters in a direction of the second diffraction grating member 43, compared to the case of parallel light that enters the light guiding plate 41 at an angle at which the parallel light enters in the opposite direction. Further, the shape of an interference fringe formed in the second diffraction grating member 43 and the shape of an interference fringe formed in the first diffraction grating member 42 are symmetric about an imaginary plane that is vertical to the axis of the light guiding plate 41. Surfaces of the first diffraction grating member 42 and the second diffraction grating member 43 that do not face the light guiding plate 41 may be covered with a transparent resin plate or a transparent resin film to prevent the first diffraction grating member 42 and the second diffraction grating member 43 from being damaged. Further, a transparent protective film may be attached to the second surface 41B to protect the light guiding plate 41.

Basically, the light guiding plate 41 in the fourth embodiment described later includes the same configuration and structure as those of the light guiding plate 41 described above.

In the third embodiment or in the fifth embodiment described later, the image forming apparatus 30 is the image forming apparatus having the first configuration, and includes a plurality of pixels arranged in a two-dimensional matrix. Specifically, the image forming apparatus 30 includes an organic EL display apparatus 31B. An image that exits the organic EL display apparatus 31B passes through a first convex lens 31C that is included in a lens system. The image further passes through a second convex lens 31E that is included in the lens system to become parallel light, and is headed for the light guiding plate 41. A front focal position f2F of the second convex lens 31E coincides with a back focal position f1B of the first convex lens 31C. Further, a diaphragm 31D is arranged at the back focal position f1B of the first convex lens 31C (the front focal position f2F of the second convex lens 31E). The diaphragm 31D corresponds to an image exit section. The entirety of the image forming apparatus 30 is accommodated in a housing 31A (the housing 30'). The housing 31A is attached to the frame 10 by an appropriate method. The organic EL display apparatus 31B includes a plurality of (for example, 640×480) pixels (organic EL elements) arranged in a two-dimensional matrix.

Figure 20B:
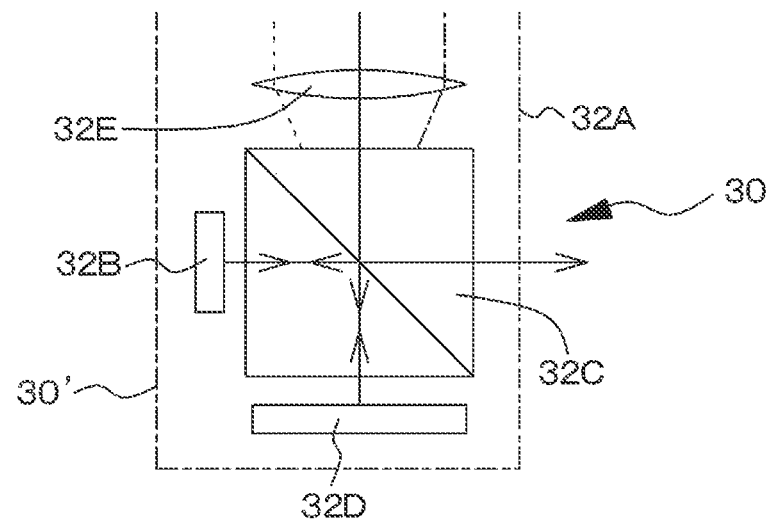

Alternatively, as illustrated in FIG. 20B, the image forming apparatus 30 is the image forming apparatus having the first configuration, and includes a plurality of pixels arranged in a two-dimensional matrix. Specifically, the image forming apparatus 30 includes a reflective spatial light modulating apparatus, and a light source 32B including a light-emitting diode that emits white light. The entirety of the image forming apparatus 30 is accommodated in a housing 32A (indicated by a dot-dash line in FIG. 20B). The housing 32A (the housing 30') includes an opening (not illustrated), and light exits an optical system (a parallel-light output optical system or a collimating optical system 32E) through the opening. The housing 32A is attached to the frame 10 by an appropriate method. The reflective spatial light modulating apparatus includes a liquid crystal display apparatus (LCD) 32D of LCOS that serves as a light bulb. The reflective spatial light modulating apparatus further includes a polarization beam splitter 32C in which a portion of light from the light source 32B is reflected off the polarization beam splitter 32C to be guided to the liquid crystal display apparatus 32D, and a portion of light reflected off the liquid crystal display apparatus 32D passes through the polarization beam splitter 32C to be guided to the optical system 32E. The liquid crystal display apparatus 32D includes a plurality of (for example, 640×480) pixels (liquid crystal cells or liquid crystal display elements) arranged in a two-dimensional matrix. The polarization beam splitter 32C has a well-known configuration and structure. Unpolarized light emitted by the light source 32B impinges on the polarization beam splitter 32C. A p-polarization component passes through the polarization beam splitter 32C, and exits the system. On the other hand, an s-polarization component is reflected off the polarization beam splitter 32C, and enters the liquid crystal display apparatus 32D. Further, the s-polarization component is reflected within the liquid crystal display apparatus 32D, and exits the liquid crystal display apparatus 32D. Here, from among light exiting the liquid crystal display apparatus 32D, light exiting a pixel used to display "white" includes a large amount of p-polarization component, and light exiting a pixel used to display "black" includes a large amount of s-polarization component. Thus, from among light that exits the liquid crystal display apparatus 32D and impinges on the polarization beam splitter 32C, the p-polarization component passes through the polarization beam splitter 32C to be guided to the optical system 32E. On the other hand, the s-polarization component is reflected off the polarization beam splitter 32C to be returned to the light source 32B. The optical system 32E includes, for example, a convex lens, and the image forming apparatus 30 (more specifically, the liquid crystal display apparatus 32D) is arranged at a point (a position) corresponding to a focal length of the optical system 32E, in order to generate parallel light. An image exiting the image forming apparatus 30 reaches the pupil 61 of the observer 60 through the optical member 40.

Information and data regarding an image to be displayed on the image display apparatus 20, or a signal to be received by a reception apparatus is recorded, held, or saved in, for example, a so-called cloud computer or server. When the display apparatus includes a communication mechanism (a transmission-and-reception apparatus) such as a cellular phone or a smartphone, or when the communication mechanism (the reception apparatus) is incorporated into the control apparatus (the control circuit or the control mechanism) 18 included in the display apparatus, various information and data, or a signal can be communicated and exchanged between the cloud computer or server and the display apparatus through the communication mechanism; a signal based on various information and data, that is, a signal used to display an image on the image display apparatus 20 can be received; and the reception apparatus can receive a signal.

Specifically, when an observer performs input to a cellular phone or a smartphone to make a request for "information" to be obtained, the cellular phone or the smartphone accesses a cloud computer or a server to obtain the "information" from the cloud computer or the server. Accordingly, the control apparatus 18 receives a signal used to display an image on the image display apparatus 20. The control apparatus 18 performs well-known image processing on the basis of the received signal, and displays the "information" on the image forming apparatus 30 in the form of an image. The image of the "information" is displayed at a specified position on the light guiding plate 41 in the form of a virtual image, on the basis of light exiting the image forming apparatus 30, the specified position being controlled by the control apparatus 18. In other words, a virtual image is formed in a portion of a virtual image forming region (the second deflection mechanism 43).

In some cases, a signal used to display an image on the image display apparatus 20 may be stored in the display apparatus (specifically, in the control apparatus 18).

Further, an image captured by an image-capturing apparatus (a camera) 19 that is provided to a center portion 11' of the rim portion 11 may be transmitted to a cloud computer or a server through the communication mechanism, various information and data that correspond to the image captured by the image-capturing apparatus 19 may be searched for in the cloud computer or the server, various information and data that are obtained by the search may be transmitted to the display apparatus through the communication mechanism, and an image may be displayed on the image display apparatus 20 on the basis of the various information and data being obtained by the search. Furthermore, when such a configuration and input of "information" are used in combination, information regarding, for example, the location of an observer and a direction that the observer is facing can be added. This makes it possible to display the "information" on the image forming apparatus 30 with a higher degree of accuracy.

Fourth Embodiment

Figure 21:
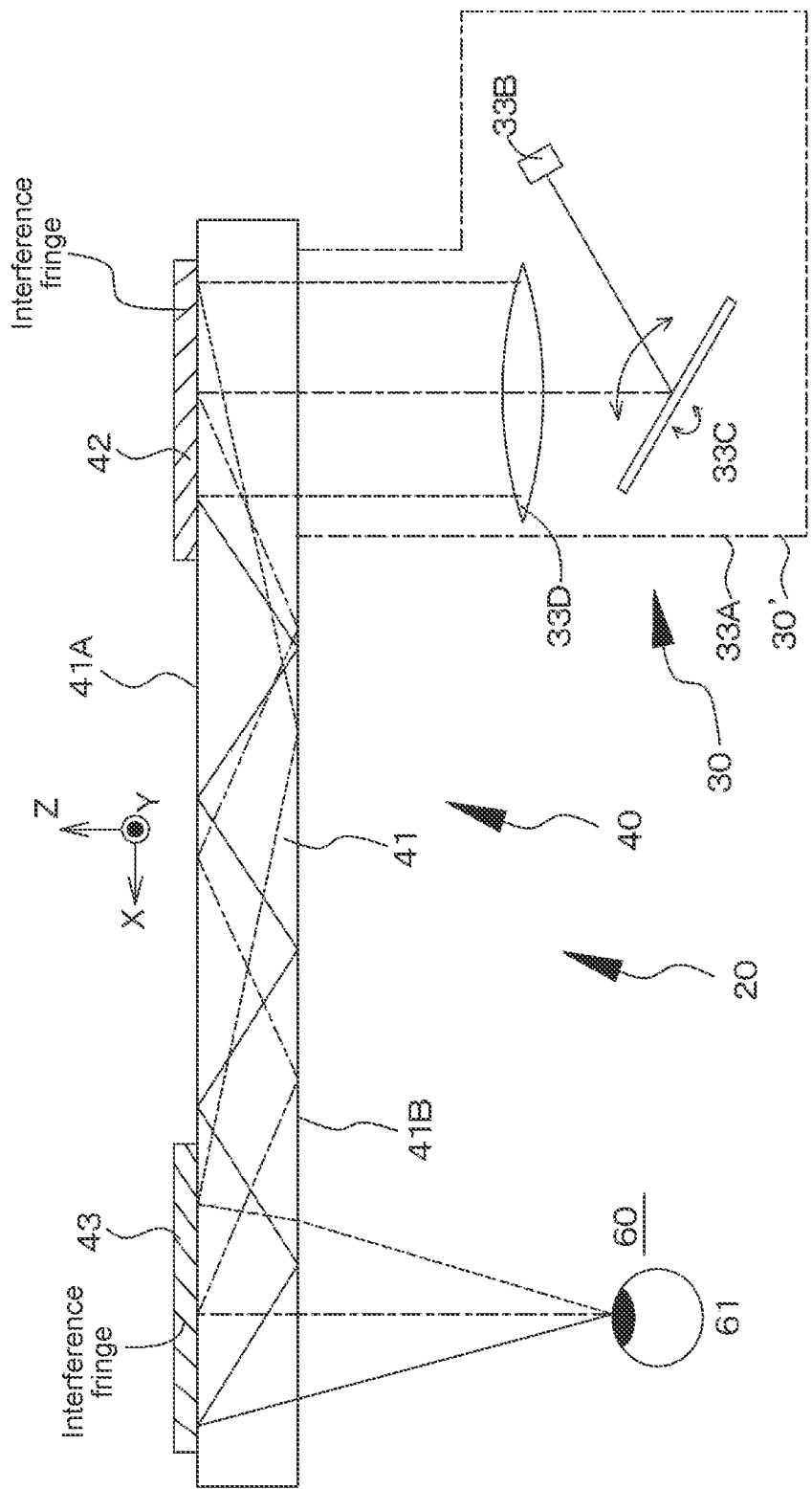
FIG. 21 schematically illustrates the arrangement of the image forming apparatus and the optical member being included in the display apparatus of a fourth embodiment.

FIG. 21 is a conceptual diagram of the image display apparatus 20 in the display apparatus (a head-mounted display) of the fourth embodiment. In the fourth embodiment, the image forming apparatus 30 is the image forming apparatus having the second configuration. In other words, the image forming apparatus 30 includes a light source 33B, a scanning mechanism 33C that two-dimensionally scans parallel light emitted by the light source 33B, and a lens system 33D that forms light emitted by the light source 33B into parallel light. The entirety of the image forming apparatus 30 is accommodated in a housing 33A (the housing 30'). The housing 33A includes an opening (not illustrated), and light exits the lens system 33D through the opening. Further, the housing 33A is attached to the frame 10 by an appropriate method.

The light source 33B includes, for example, a semiconductor laser element. Further, light emitted by the light source 33B is formed into parallel light by a lens (not illustrated). The parallel light is horizontally scanned and vertically scanned by the scanning mechanism 33C, which is a MEMS mirror that includes a two-dimensionally rotatable micromirror and can two-dimensionally scan incident parallel light. A kind of two-dimensional image is formed, and a virtual pixel (the number of pixels may be, for example, the same as the number of pixels in the third embodiment) is generated. Further, light from the virtual pixel (the scanning mechanism 33C corresponding to an image exit portion) passes through the lens system 33D having a positive optical power. A pencil of light is formed into parallel light, and the parallel light enters the light guiding plate 41.

Fifth Embodiment

Figure 22:
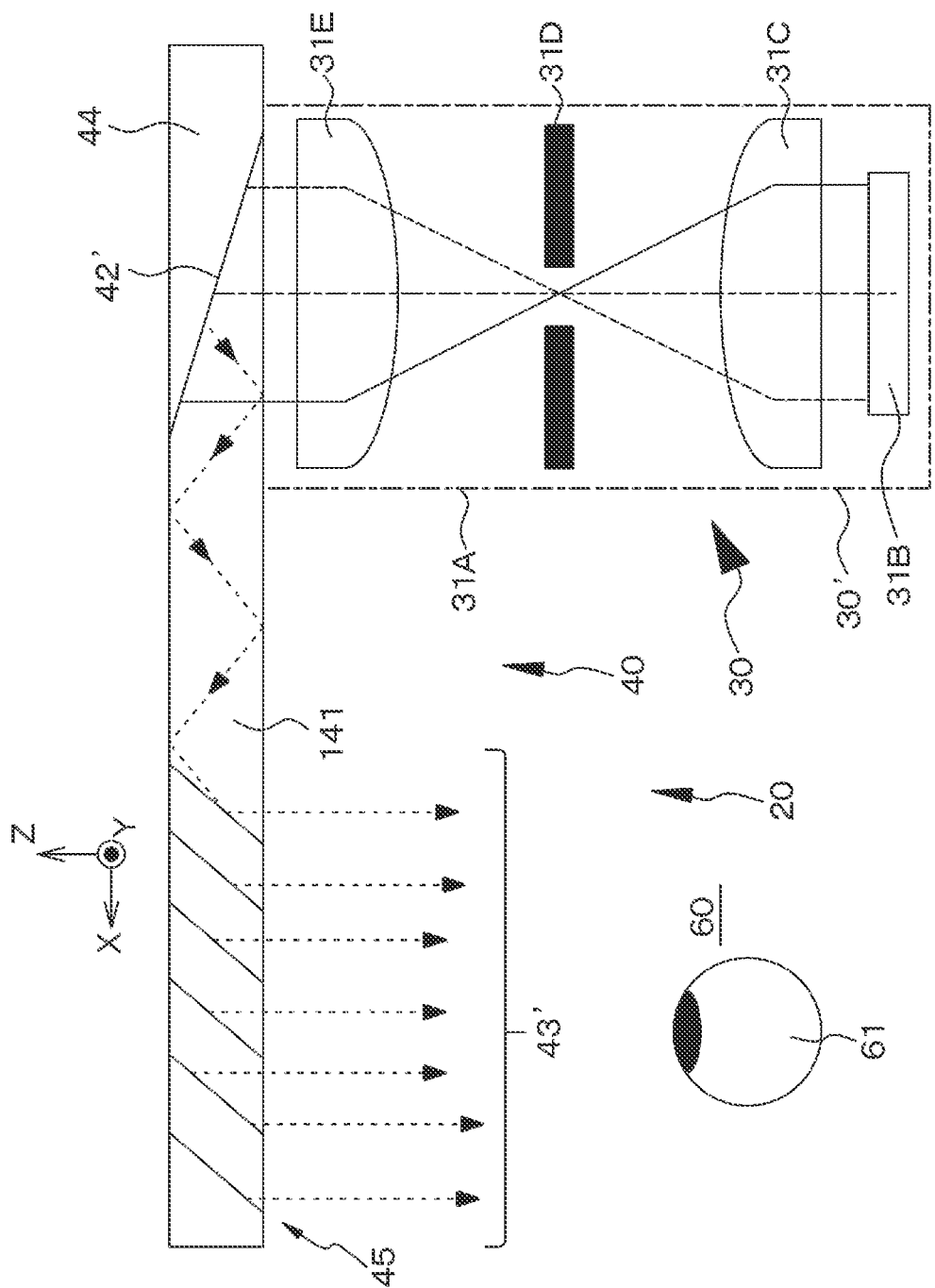
FIG. 22 schematically illustrates the arrangement of the image forming apparatus and the optical member being included in the display apparatus of a fifth embodiment.

FIG. 22 is a conceptual diagram of the image display apparatus 20 in the display apparatus (a head-mounted display) of the fifth embodiment. In the fifth embodiment, a first deflection mechanism 42' and a second deflection mechanism 43' are arranged within a light guiding plate 141. Further, light that enters the light guiding plate 141 is reflected off the first deflection mechanism 42', and the light being totally reflected within the light guiding plate 141 to propagate through the light guiding plate 141 is transmitted through and reflected off the second deflection mechanism 43' multiple times. In other words, the first deflection mechanism 42' serves as a reflecting mirror, and the second deflection mechanism 43' serves as a semi-transmissive mirror. More specifically, the first deflection mechanism 42' provided within the light guiding plate 141 includes a light reflective film (a type of mirror) that is made of aluminum (Al) and off which light that enters the light guiding plate 141 is reflected. On the other hand, the second deflection mechanism 43' provided within the light guiding plate 141 includes a multilayer stacking structure that includes multilayered dielectric film stacks. The dielectric film stack includes, for example, a $TiO_2$ film that is a high dielectric constant material, and a $SiO_2$ film that is a low dielectric constant material. Japanese Unexamined Patent Application Publication No. 2005-521099 discloses a multilayer stacking structure that includes multilayered dielectric film stacks. The figure illustrates six-layer dielectric film stacks, but the configuration is not limited thereto. A thin portion made of the same material as the material of the light guiding plate 141 is situated between the dielectric film stacks. Parallel light that enters the light guiding plate 141 is reflected off the first deflection mechanism 42' such that the parallel light entering the light guiding plate 141 is totally reflected within the light guiding plate 141. On the other hand, the parallel light that is totally reflected within the light guiding plate 141 to propagate through the light guiding plate 141 is reflected off the second deflection mechanism 43' multiple times, and exits the light guiding plate 141 to be headed for the pupil 61 of the observer 60 in the form of the parallel light.

With respect to the first deflection mechanism 42', it is sufficient if a portion 44 to which the first deflection mechanism 42' is provided, is cut out of the light guiding plate 141 to form, in the light guiding plate 141, an inclined surface on which the first deflection mechanism 42' is to be formed; a light reflective film is formed on the inclined surface using vacuum deposition; and thereafter the portion 44 cut out of the light guiding plate 141 is bonded to the first deflection mechanism 42'. Further, with respect to the second deflection mechanism 43', it is sufficient if a multilayer stacking structure in which a material (such as glass) that is the same as the material of the light guiding plate 141, and a dielectric film stack (that can be formed using, for example, vacuum deposition) are arranged in a multilayered formation, is produced; a portion 45 to which the second deflection mechanism 43' is provided, is cut out of the light guiding plate 141 to form an inclined surface in the light guiding plate 141; the multilayer stacking structure is bonded to the inclined surface; and polishing or the like is performed to arrange the external shape. Accordingly, the optical member 40 in which the first deflection mechanism 42' and the second deflection mechanism 43' are provided within the light guiding plate 141 can be obtained.

Figure 23:
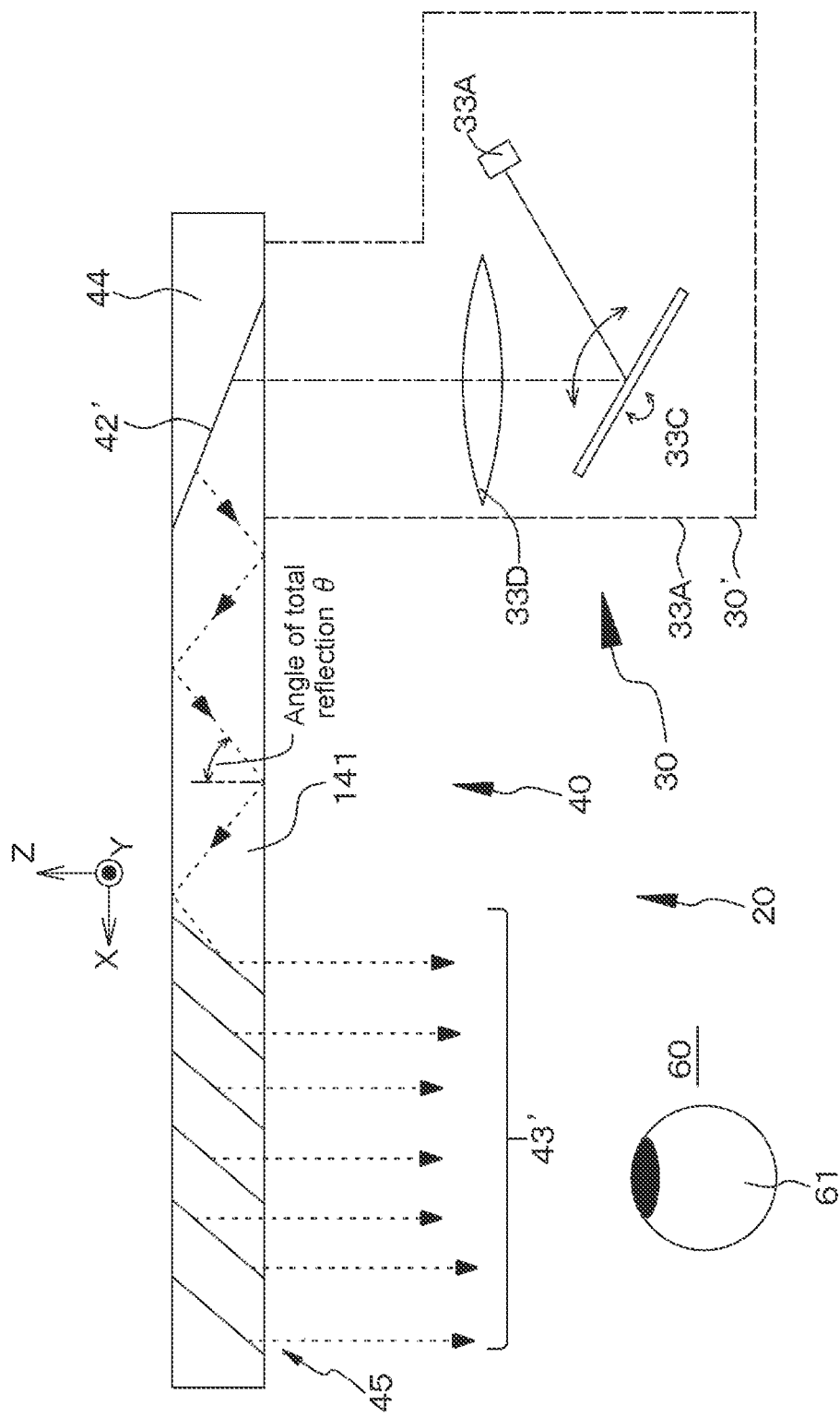
FIG. 23 schematically illustrates the arrangement of the image forming apparatus and the optical member being included in a modification of the display apparatus of the fifth embodiment.

Alternatively, FIG. 23 illustrates a conceptual diagram of the image display apparatus 20 in a modification of the display apparatus (a head-mounted display) of the fifth embodiment. In the example illustrated in FIG. 23, the image forming apparatus 30 is the image forming apparatus having the second configuration, as in the case of the fourth embodiment.

Sixth Embodiment

Figure 24A:
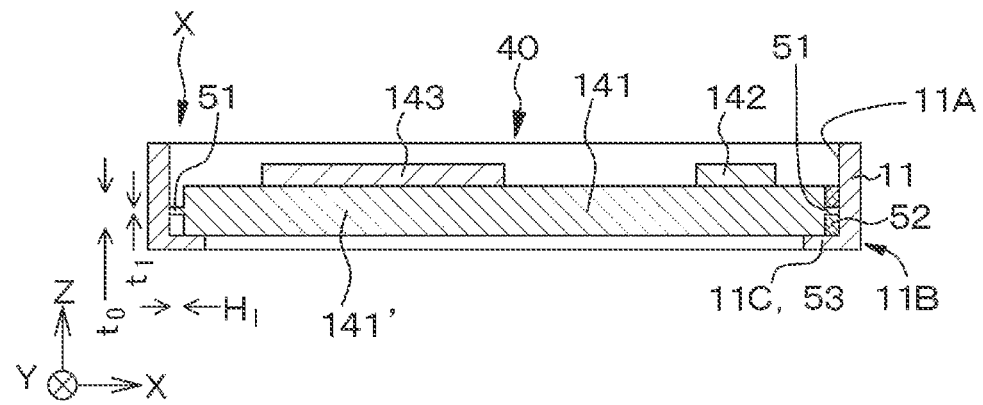
FIG. 24A is a schematic cross-sectional view of the optical member of a sixth embodiment.
Figure 24B:
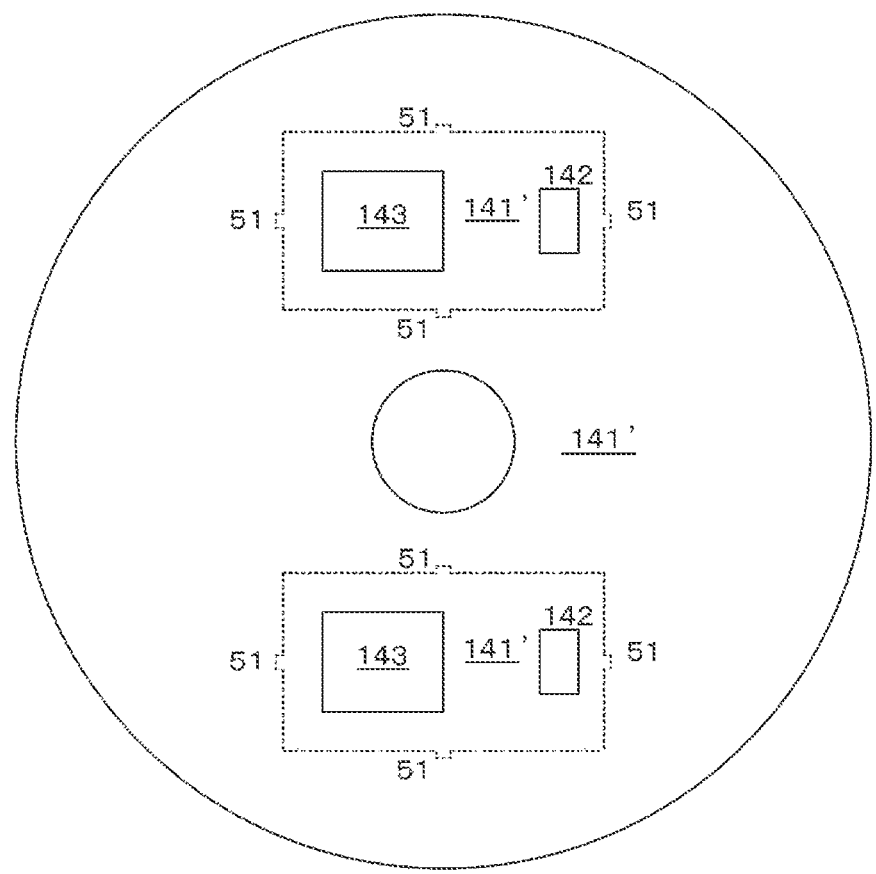
FIG. 24B is a schematic plan view of, for example, a resin plate, the schematic plan view being used to describe a method for manufacturing the optical member of the sixth embodiment.

The sixth embodiment is a modification of the first to fifth embodiments. FIG. 24A is a schematic cross-sectional view of the optical member of the sixth embodiment, and FIG. 24B is a schematic plan view of, for example, a resin plate, the schematic plan view being used to describe a method for manufacturing the optical member of the sixth embodiment.

The sixth embodiment is different from the first to fifth embodiments in that a first deflection mechanism 142 and a second deflection mechanism 143 each include a diffractive optical element (DOE). Further, the hard coat layer 47 is not formed. The first deflection mechanism 142 and the second deflection mechanism 143 are formed integrally with a resin plate 141' using the same material as the resin plate 141'. Specifically, the first deflection mechanism 142 and the second deflection mechanism 143 are formed by polycarbonate-resin injection molding. Except for the points described above, the light guiding plate 141 of the sixth embodiment includes a configuration and a structure that are similar to those of the light guiding plate 41 of the first embodiment.

The method for manufacturing the optical member of the sixth embodiment is described below.

First, the resin plate 141' is obtained by polycarbonate-resin injection molding. The resin plate 141' has a doughnut-like (disc) shape having an outer diameter of 120 mm and an inner diameter of 15 mm. The resin plate 141' has the same shape as a compact disc (CD). In, for example, each of two portions of the resin plate 141', the first deflection mechanism 142 and the second deflection mechanism 143 are formed integrally with the resin plate 141'. Since the first deflection mechanism 142 and the second deflection mechanism 143 are formed integrally with the resin plate 141', a plurality of deflection mechanisms including the first deflection mechanism 142 and the second deflection mechanism 143 is positioned relative to the resin plate 141' with a very high degree of accuracy.

Next, an outer shape process is performed by stamping out a portion indicated by a dotted line from the resin plate 141', as illustrated in FIG. 24B. The two portions can be simultaneously stamped out from the resin plate 141'. In the stamping, the resin plate 141' is placed on the on-placement base (the on-placement stage) 71 including an alignment mark, and the first deflection mechanism 142 or the second deflection mechanism 143 is aligned with the alignment mark. A convex portion into which a center hole provided to the resin plate 141' is to be fitted, is provided to the on-placement base 71 in advance. Then, the convex portion provided to the on-placement base 71 is fitted into the center hole provided to the resin plate 141', and the resin plate 141' is rotatably fixed to the on-placement base 71 to perform alignment while rotating the resin plate 141'.

Subsequent processes are similar to the processes described in the first embodiment. Thus, a detailed description is omitted.

In the optical member manufacturing method of the sixth embodiment, the first deflection mechanism 142 and the second deflection mechanism 143 are formed integrally with the resin plate 141' larger than the resin plate 141' forming the light guiding plate 40. Thereafter, alignment is performed on the basis of the first deflection mechanism 142 or the second deflection mechanism 143, and an outer shape process that is specifically stamping is performed on the resin plate 141' to manufacture a light guiding plate. This makes it possible to manufacture light guiding plates in various kinds of sizes from mass-manufactured resin plates 141' and thus to manufacture, at low costs, light guiding plates in various kinds of sizes that meet the needs of customers. In particular, the optical member manufacturing method of the sixth embodiment makes it possible to form the resin plate 141' in size of a general-purpose CD by resin molding. This results in being able to use existing facilities, and thus in providing a great effect in reducing costs.

Further, it is often the case that there is a difficulty in positioning the resin plate 141' relative to the stamping apparatus in a rotational direction. In the optical member manufacturing method of the sixth embodiment, the resin plate 141' can be rotated on the basis of the first deflection mechanism 142 or the second deflection mechanism 143 to perform alignment. This makes it possible to easily position the resin plate 141' relative to the lower blade 73 and the upper blade 74 in a rotational direction. Consequently, the first deflection mechanism 142 and the second deflection mechanism 143 are positioned relative to the lower blade 73 and the upper blade 74 with a very high degree of accuracy. Furthermore, when the rotational direction is determined, this results in performing positioning in an X direction and a Y direction with a very high degree of accuracy. This makes it possible to keep the positional accuracy in two light guiding plates 141 for which stamping is simultaneously performed. This results in improving the manufacturing efficiency, and thus in providing a greater effect in reducing costs.

Stamping is adopted as the outer shape process in the optical member manufacturing method of the sixth embodiment described above, but cutting can also be adopted. Further, the resin plate 141' is manufactured by polycarbonate-resin injection molding. A polycarbonate resin is slightly less fluent than cycloolefin copolymer (COP) upon performing injection molding, but is generally used in a CD and a DVD. This results in being able to use existing facilities, and thus in providing a great effect in reducing costs. Furthermore, the resin plate exhibits excellent optical characteristics since proven formation conditions can be used. Note that a light guiding plate that includes a protrusion extending from a portion of a lateral surface of the light guiding plate, and that includes a first deflection mechanism and a second deflection mechanism that each include a diffractive optical element (DOE) can also be obtained by injection molding.

The present disclosure has been described above on the basis of the favorable embodiments. However, the present disclosure is not limited to these embodiments. The configurations and the structures of the display apparatus (the head-mounted display), the image display apparatus, and the optical member described in the embodiments are merely illustrative, and modifications may be made thereto as appropriate.

Further, for example, a surface relief hologram (refer to US 2004/0062505 A1) may be provided to the light guiding plate, or the surface relief diffraction grating disclosed in U.S. Pat. No. 9,513,480 B2 (US 2016/0231568 A1) may be used as the diffraction grating member. One of the first deflection mechanism and the second deflection mechanism may include a reflective diffraction grating member, and the other may include a transmissive diffraction grating member. Further, the diffraction grating member may be a reflective blazed diffraction grating member, or the hologram diffraction grating member may include the polymer-dispersed liquid crystal (PDLC) mixture disclosed in Japanese Patent Application Laid-open No. 2014-132328.

Furthermore, the display apparatus of the present disclosure can also be used as a stereoscopic display apparatus. In this case, it is sufficient if a polarizing plate or a polarizing film is removably attached to the optical member, or a polarizing plate or a polarizing film is bonded to the optical member.

The example in which the image forming apparatus displays an image in one color (for example, green) has been described in the embodiments, but the image forming apparatus can also display a color image. In this case, it is sufficient if the light source includes a light source that emits red light, a light source that emits green light, and a light source that emits blue light. More specifically, it is sufficient if, for example, red light, green light, and blue light that are respectively emitted by a red-light-emitting element, a green-light-emitting element, and a blue-light-emitting element are mixed and the brightness is made uniform using a light pipe to obtain white light.

Figure 25:
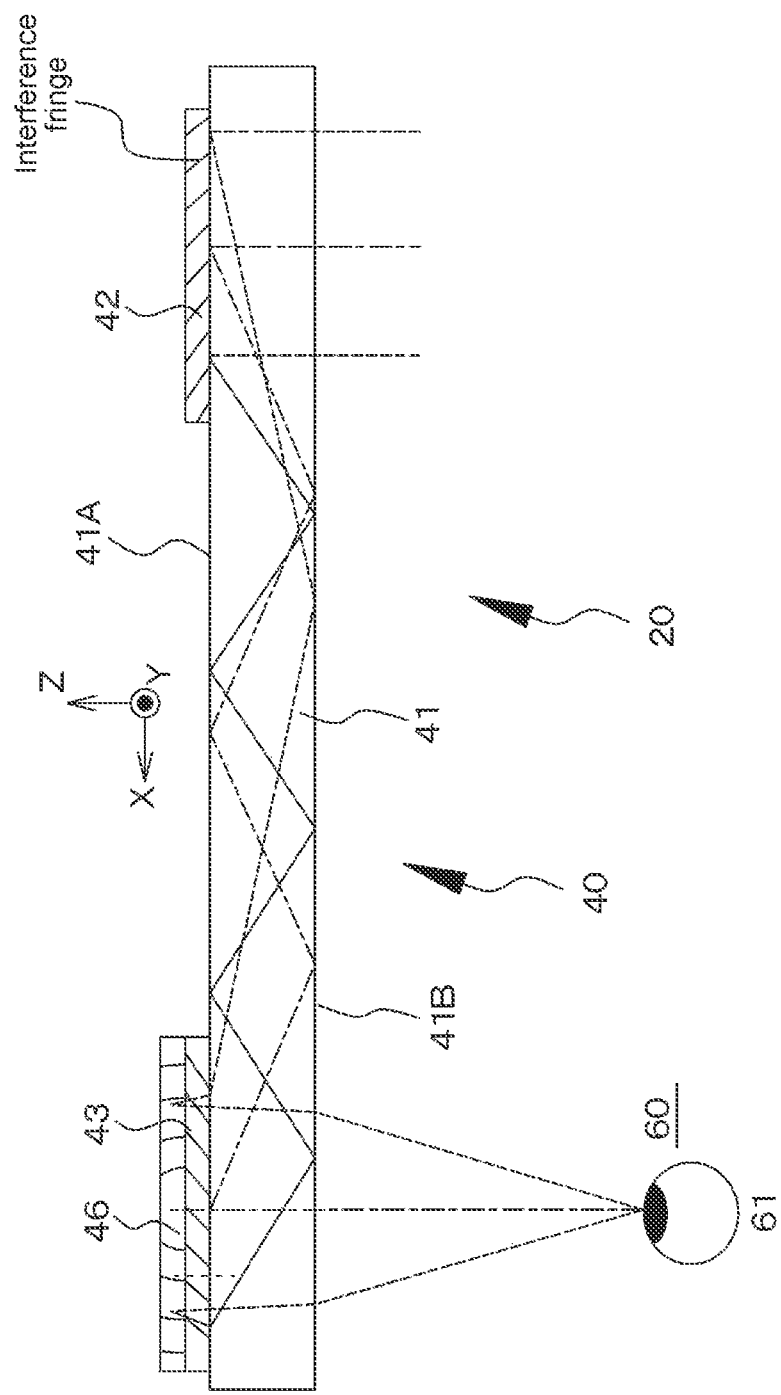
FIG. 25 schematically illustrates a modification of the optical member included in the display apparatus illustrated in the third or fourth embodiment.
Figure 26:
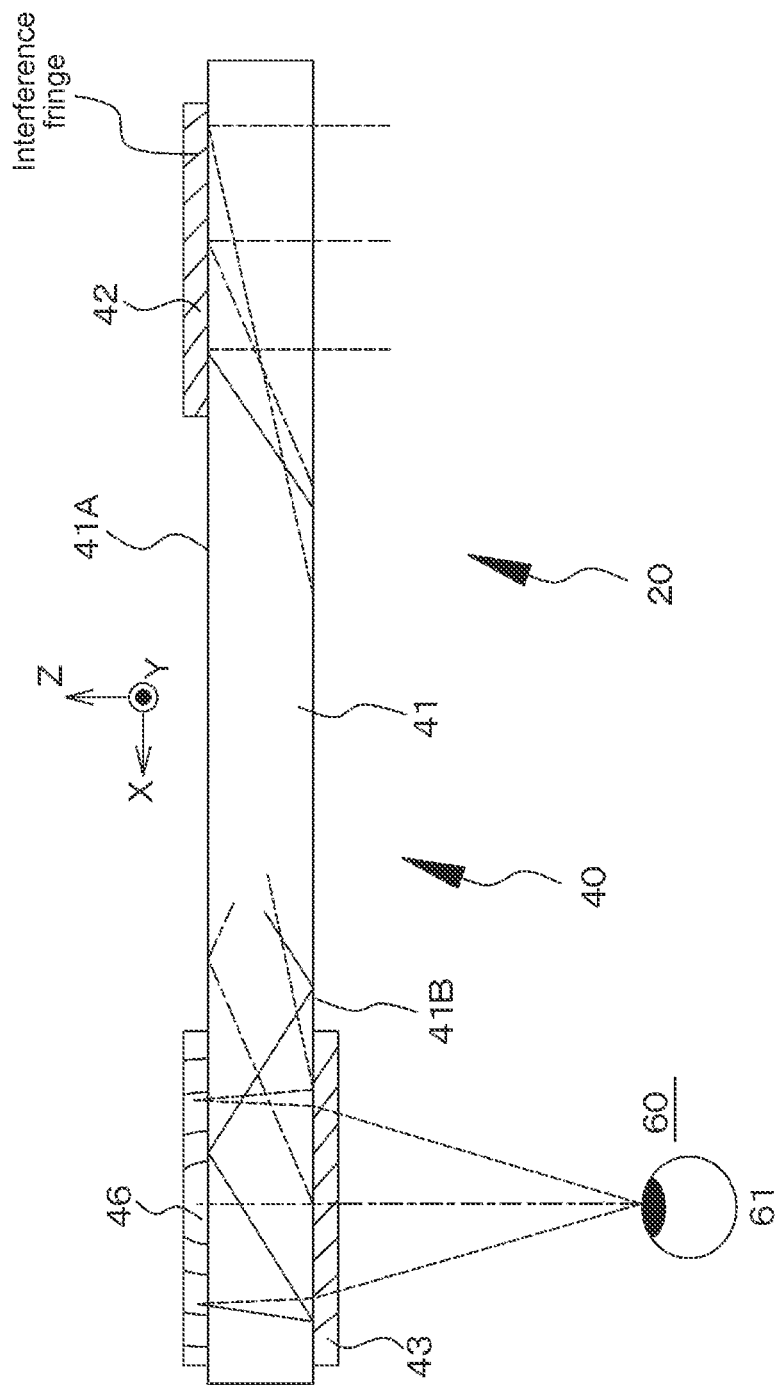
FIG. 26 schematically illustrates another modification of the optical member included in the display apparatus illustrated in the third or fourth embodiment.

FIGS. 25 and 26 illustrate modifications of the optical member illustrated in the third or fourth embodiment. A hologram lens 46 may be arranged on the optical member 40 to face the second deflection mechanism 43. Light from the image forming apparatus 30 is deflected by (or reflected off) the first deflection mechanism 42, and is totally reflected within the light guiding plate 41 to propagate through the light guiding plate 41. The light is deflected by the second deflection mechanism 43 to enter the hologram lens 46, and exits the hologram lens 46 to be headed for the pupil 61 of the observer 60. A large portion of light passing through the second deflection mechanism 43 does not satisfy the diffraction condition for the second deflection mechanism 43. Thus, the light is incident on the pupil 61 of the observer 60 without being diffractively reflected off the second deflection mechanism 43. The hologram lens 46 includes, for example, a hologram lens, and is arranged on, for example, the side of the first surface of the light guiding plate 41. The second deflection mechanism 43 is arranged on the side of the first surface of the light guiding plate 41 (refer to FIG. 25) or on the side of the second surface of the light guiding plate 41 (refer to FIG. 26).

Figure 27:
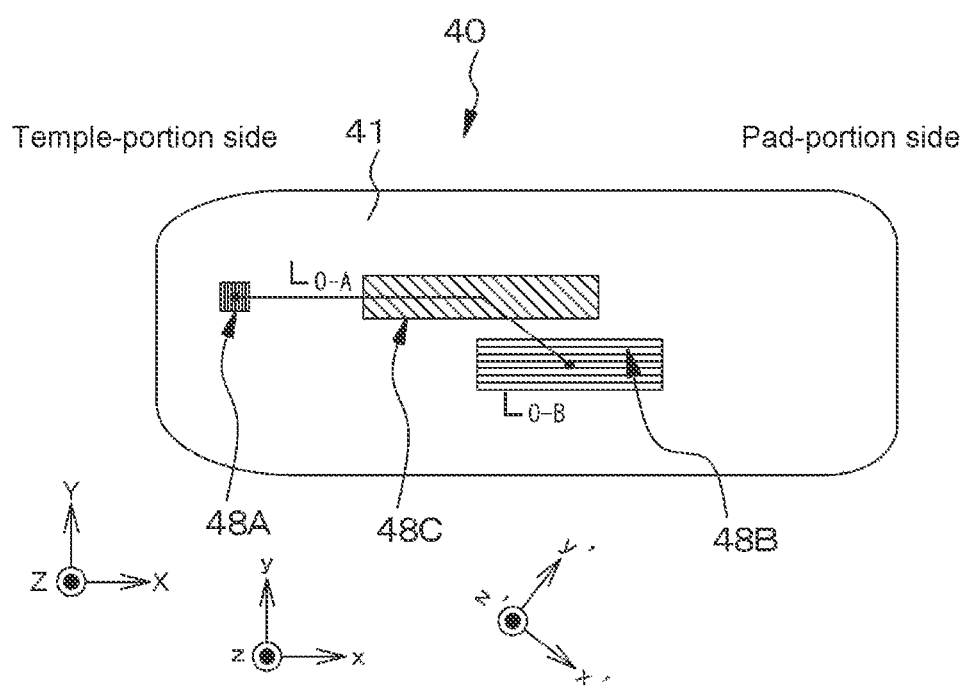
FIG. 27 is a conceptual diagram of yet another modification of the optical member included in the display apparatus illustrated in the third or fourth embodiment.

Modifications described below may be made to the optical member described in the third or fourth embodiment. In other words, FIG. 27 illustrates a conceptual diagram of the optical member, and as illustrated in FIG. 27, a first reflective volume-hologram diffraction grating member 48A, a second reflective volume-hologram diffraction grating member 48B, and a third reflective volume-hologram diffraction grating member 48C may be included. In the first reflective volume-hologram diffraction grating member 48A, an interference fringe of a diffraction grating member extends substantially parallel to a Y axis (a y axis). In the second reflective volume-hologram diffraction grating member 48B, an interference fringe of a diffraction grating member extends substantially parallel to an X axis (an x axis). In the third reflective volume-hologram diffraction grating member 48C, an interference fringe of a diffraction grating member extends obliquely (in a y' direction). A light ray exiting the image forming apparatus 30 is diffracted by the first reflective volume-hologram diffraction grating member 48A in an X-axis direction, propagates through the light guiding plate 41, and enters the third reflective volume-hologram diffraction grating member 48C. Then, the light ray is diffracted obliquely downward by the third reflective volume-hologram diffraction grating member 48C, and enters the second reflective volume-hologram diffraction grating member 48B. Then, the light ray is diffracted by the second reflective volume-hologram diffraction grating member 48B in a Z-axis direction, and is incident on the pupil 61 of the observer 60. A line that connects an entrance point and an exit point includes two lines L0-A and L0-B. A light-guiding region includes two regions that are

[A] a region, in the light guiding plate 41, that faces a region situated between a right end of the first reflective volume-hologram diffraction grating member 48A in FIG. 27 and a left end of the third reflective volume-hologram diffraction grating member 48C in FIG. 27, and

[B] a region, in the light guiding plate 41, that faces a region situated between a lower end of the third reflective volume-hologram diffraction grating member 48C in FIG. 27 and an upper end of the second reflective volume-hologram diffraction grating member 48B in FIG. 27.

Further, the entirety of the light-guiding region includes the two regions in the light guiding plate 41 described above,

[C] a region, in the light guiding plate 41, that faces the first reflective volume-hologram diffraction grating member 48A,

[D] a region, in the light guiding plate 41, that faces the third reflective volume-hologram diffraction grating member 48C, and

[E] a region, in the light guiding plate 41, that faces the second reflective volume-hologram diffraction grating member 48B.

Figure 28A:
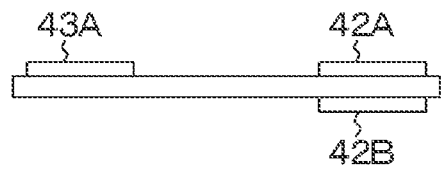
FIGS. 28A, 28B, 28C, 28D, 28E, and 28F are conceptual diagrams of yet other modifications of the optical member included in the display apparatus of the third or fourth embodiment.
Figure 28B:
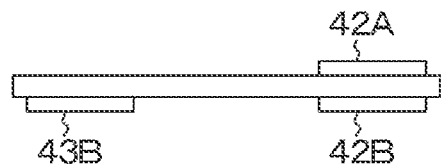
Figure 28C:
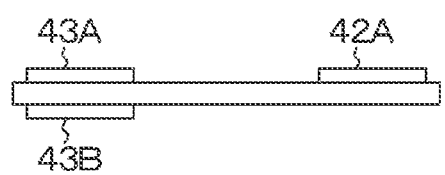
Figure 28D:
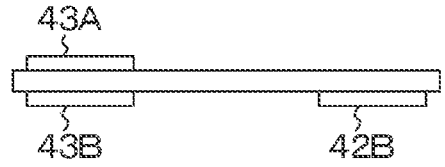
Figure 28E:
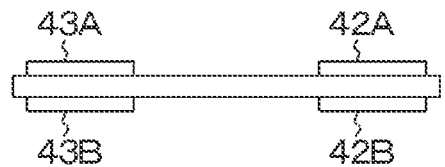
Figure 28F:
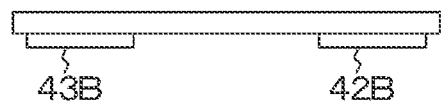

Further, modifications described below may be made to the optical member described in the third and fourth embodiments. In other words, as illustrated in conceptual diagrams of FIGS. 28A and 28B, a hologram diffraction grating member on a light entrance side may be two reflective diffraction grating members 42A and 42B, and a hologram diffraction grating member on a light exit side may be a reflective diffraction grating member 43A (refer to FIG. 28A) or a reflective diffraction grating member 43B (refer to FIG. 28B). Furthermore, as illustrated in conceptual diagrams of FIGS. 28C and 28D, the hologram diffraction grating member on the light entrance side may be the reflective diffraction grating member 42A (refer to FIG. 28C) or the reflective diffraction grating member 42B (refer to FIG. 28D), and the hologram diffraction grating member on the light exit side may be the two reflective diffraction grating members 43A and 43B. Further, as illustrated in a conceptual diagram of FIG. 28E, the hologram diffraction grating member on the light entrance side may be the two reflective diffraction grating members 42A and 42B, and the hologram diffraction grating member on the light exit side may be the two reflective diffraction grating members 43A and 43B. Furthermore, as illustrated in a conceptual diagram of FIG. 28F, the hologram diffraction grating member on the light entrance side may be a transmissive diffraction grating member 42C, and the hologram diffraction grating member on the light exit side may be a transmissive diffraction grating member 43C.

Note that the present disclosure may also take the following configurations.

[A01] «Display Apparatus»

A display apparatus, including:
  a frame that includes a rim portion; and
  an image display apparatus that is attached to the frame,
  the image display apparatus including
    an image forming apparatus, and
    an optical member that guides an image coming from the image forming apparatus to a pupil of an observer,
  the optical member including
    a light guiding plate that is formed of a resin plate, and includes a first surface and a second surface that faces the first surface,
    a first deflection mechanism that is provided to the first surface or the second surface of the light guiding plate, and
    a second deflection mechanism that is provided to the first surface or the second surface of the light guiding plate, in which
  light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer,
  the light guiding plate includes a protrusion (specifically, a protrusion in the form of a burr) that extends from a portion of a lateral surface of the light guiding plate, and
  the light guiding plate is fixed to an interior lateral face of the rim portion using an adhesive in a state in which a tip of the protrusion is in contact with the interior lateral face of the rim portion.

[A02] The display apparatus according to [A01], in which $t1/t0 \leq 0.05$, and favorably, $0.01 \leq t1/t0 \leq 0.05$ is satisfied when a thickness of the light guiding plate is t0 and a thickness of the protrusion is t1.

[A03] The display apparatus according to [A01] or [A02], in which
  $0.05 \leq H1/t0 \leq 0.2$ is satisfied when a thickness of the light guiding plate is t0 and a height of the protrusion that is measured from the lateral surface of the light guiding plate is H1.

[A04] The display apparatus according to any one of [A01] to [A03], in which
  a light-guiding-plate receiving portion is provided to the rim portion to face an outer peripheral portion of the light guiding plate.

[A05] The display apparatus according to [A04], in which
  the light-guiding-plate receiving portion is provided to the rim portion to face a portion of the outer peripheral portion of the light guiding plate.

[A06] The display apparatus according to any one of [A01] to [A05], in which
  all of the periphery of the light guiding plate is fixed to the interior lateral face of the rim portion using the adhesive.

[A07] The display apparatus according to any one of [A01] to [A05], in which
  a portion of the light guiding plate is fixed to the interior lateral face of the rim portion using the adhesive.

[A08] The display apparatus according to any one of [A01] to [A07], in which the adhesive is an ultraviolet curable adhesive.

[A09] The display apparatus according to any one of [A01] to [A08], in which
  the light guiding plate is formed of a transparent resin plate.

[A10] The display apparatus according to any one of [A01] to [A09], in which
  a hard coat layer is formed on the first surface and the second surface of the light guiding plate.

[A11] The optical member according to [A10], in which
  the hard coat layer is not formed on the lateral surface of the light guiding plate.

[A12] The optical member according to [A10] or [A11], in which
  the hard coat layer is made of an organic material of which a contact angle with respect to water is greater than or equal to 100 degrees and of which a pencil hardness is greater than or equal to 4H.

[B01] «Optical Member»

An optical member that guides light that enters from an image forming apparatus such that the light exits the optical member to be headed for an observer, the optical member including:
  a light guiding plate that is formed of a resin plate, and includes a first surface and a second surface that faces the first surface;
  a first deflection mechanism that is provided to the first surface or the second surface of the light guiding plate; and
  a second deflection mechanism that is provided to the first surface or the second surface of the light guiding plate, in which
  light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer, and
  the light guiding plate includes a protrusion (specifically, a protrusion in the form of a burr) that extends from a portion of a lateral surface of the light guiding plate.

[C01] «Method for Manufacturing Optical Member»

A method for manufacturing an optical member that guides light that enters from an image forming apparatus such that the light exits the optical member to be headed for an observer, the optical member including
  a light guiding plate that is formed of a resin plate, and includes a first surface and a second surface that faces the first surface,
  a first deflection mechanism that is provided to the first surface or the second surface of the light guiding plate, and
  a second deflection mechanism that is provided to the first surface or the second surface of the light guiding plate, in which
  light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer, the method including:
providing the resin plate provided with the first deflection mechanism and the second deflection mechanism; and
performing an outer shape process on the resin plate to obtain the light guiding plate having a desired outer shape and including a protrusion (specifically, a protrusion in the form of a burr) that extends from a portion of a lateral surface of the light guiding plate.

[C02] The method for manufacturing an optical member according to [C01], in which
the outer shape process is stamping.

[C03] The method for manufacturing an optical member according to [C01] or [C02], in which
the first deflection mechanism and the second deflection mechanism are formed integrally with the resin plate.

[C04] The method for manufacturing an optical member according to any one of [C01] to [C03], in which
the resin plate is formed using a polycarbonate resin.

[C05] The method for manufacturing an optical member according to any one of [C01] to [C04], in which
the first deflection mechanism and the second deflection mechanism each include a diffractive optical element (DOE).

[C06] The method for manufacturing an optical member according to any one of [C01] to [C05], in which
before the outer shape process, the resin plate has a doughnut-like outer shape.

[C07] The method for manufacturing an optical member according to any one of [C01] to [C05], in which
before the outer shape process, the resin plate has an outer shape that is the same shape as a compact disc (CD).

[C08] The method for manufacturing an optical member according to [C06] or [C07], in which
a hole is provided to the center of the resin plate,
before the outer shape process, a convex portion that is to be fitted into the hole is provided to an on-placement base on which the resin plate is placed, and
the resin plate is rotatably fixed to the on-placement base.

[D01] «Stamping Apparatus»

A stamping apparatus used to manufacture an optical member that guides light that enters from an image forming apparatus such that the light exits the optical member to be headed for an observer, the optical member including
a light guiding plate that is formed of a resin plate, and includes a first surface and a second surface that faces the first surface,
a first deflection mechanism that is provided to the first surface or the second surface of the light guiding plate, and
a second deflection mechanism that is provided to the first surface or the second surface of the light guiding plate, in which
light that enters the light guiding plate from the image forming apparatus through the first surface or the second surface is deflected by the first deflection mechanism, is totally reflected within the light guiding plate to propagate through the light guiding plate, is then deflected by the second deflection mechanism, and exits the light guiding plate through the second surface to be headed for the observer, and
the light guiding plate includes a protrusion (specifically, a protrusion in the form of a burr) that extends from a portion of a lateral surface of the light guiding plate, the stamping apparatus including:
an on-placement base on which the resin plate provided with the first deflection mechanism and the second deflection mechanism is placed;
a fixation base that fixes, to the on-placement base, the resin plate provided with the first deflection mechanism and the second deflection mechanism;
a lower blade used to perform stamping on the resin plate; and
an upper blade used to perform stamping on the resin plate.

[D02] The stamping apparatus according to [D01], further including:
an alignment reference point that is provided to the on-placement base; and
an alignment mechanism that aligns the first deflection mechanism or the second deflection mechanism with the alignment reference point to control a relationship in relative position between the on-placement base and a direction horizontal to the lower blade and the upper blade.

[D03] The stamping apparatus according to [D01] or [D02], in which
a specified space is formed between the lower blade and the upper blade upon performing stamping on the resin plate.

[D04] The stamping apparatus according to any one of [D01] to [D03], in which
a concave portion is formed in a portion, in the on-placement base or the fixation base, that faces the deflection mechanism, and
the deflection mechanism and the on-placement base or the fixation base are out of contact with each other.

REFERENCE SIGNS LIST 10 frame
11 rim portion (front portion)
11' center portion of rim portion
11A interior lateral face of rim portion
11B edge of rim portion
11C projecting portion that projects from rim portion
12 temple portion
13 hinge
14 temple-tip covering portion (celluloid tip, ear-fit portion, ear pad)
15 wiring (such as signal line and power supply line)
16 headphone portion
16' headphone-portion wiring
17 pad portion (nose pad portion)
18 control apparatus (control circuit, control mechanism)
19 image-capturing apparatus (camera)
20 image display apparatus
30 image forming apparatus
30' housing
30" attachment member
31A housing
31B organic EL display apparatus
31C first convex lens
31D diaphragm
31E second convex lens
32A housing
32B light source
32C polarization beam splitter 32D liquid crystal display apparatus (LCD)
32E optical system (parallel-light output optical system, collimating optical system)
33A housing
33B light source
33C scanning mechanism
33D lens system
40 optical member
41, 141 light guiding plate
41A first surface of light guiding plate
41B second surface of light guiding plate
41' resin plate
42, 42', 42A, 42B, 42C first deflection mechanism (first diffraction grating member)
43, 43', 43A, 43B, 43C second deflection mechanism (second diffraction grating member)
44 portion, in light guiding plate, to which first deflection mechanism is provided
45 portion, in light guiding plate, to which second deflection mechanism is provided
46 hologram lens
47 hard coat layer
48A first reflective volume-hologram diffraction grating member
48B second reflective volume-hologram diffraction grating member
48C third reflective volume-hologram diffraction grating member
51 protrusion (protrusion in form of burr)
52 adhesive
53 light-guiding-plate receiving portion
60 observer
61 eyeball (pupil)
71 on-placement base
72 lower blade
73 fixation base
74 upper blade
75 alignment reference point
76 concave portion

The invention claimed is:

1. A display apparatus, comprising:
a frame that includes a rim portion; and
an image display apparatus attached to the frame, wherein the image display apparatus includes:
 an image forming apparatus; and
 an optical member configured to:
  receive an image from the image forming apparatus; and
  guide the received image to a pupil of an observer, wherein the optical member includes:
   a light guiding plate that is a resin plate;
   a first deflection mechanism; and
   a second deflection mechanism, wherein
    the light guiding plate includes a protrusion, a first surface and a second surface,
    the second surface faces the first surface,
    the protrusion extends from a specific portion of a lateral surface of the light guiding plate,
    the light guiding plate is fixed, with an adhesive, to an interior lateral face of the rim portion,
    a tip of the protrusion is in contact with the interior lateral face of the rim portion,
    a first ratio of a thickness of the protrusion (t1) to a thickness of the light guiding plate (t0) is less than or equal to 0.05,
    the first deflection mechanism is on the first surface,
    the second deflection mechanism is on the second surface,
    the light guiding plate is configured to:
     receive light from the image forming apparatus through one of the first surface or the second surface;
     reflect the received light; and
     propagate the received light,
    the first deflection mechanism is configured to deflect the received light,
    the second deflection mechanism is configured to deflect the reflected light, and
    the deflected light exits the light guiding plate through the second surface.

2. The display apparatus according to claim 1, wherein
a second ratio of a height (H1) of the protrusion to the thickness of the light guiding plate (t0) is greater than or equal to 0.05 and less than or equal to 0.2, and
the height (H1) of the protrusion is measured from the lateral surface of the light guiding plate.

3. The display apparatus according to claim 1, further comprising a light-guiding-plate-receiving portion, wherein
the light-guiding-plate receiving portion is on the rim portion, and
the light-guiding-plate receiving portion faces an outer peripheral portion of the light guiding plate.

4. The display apparatus according to claim 3, wherein
the light-guiding-plate receiving portion is on the rim portion, and
the light-guiding-plate receiving portion faces a specific portion of the outer peripheral portion of the light guiding plate.

5. The display apparatus according to claim 1, wherein
a periphery of the light guiding plate is fixed, with the adhesive, to the interior lateral face of the rim portion.

6. The display apparatus according to claim 1, wherein
a specific portion of the light guiding plate is fixed, with an adhesive, to the interior lateral face of the rim portion.

7. The display apparatus according to claim 1, wherein the adhesive is an ultraviolet curable adhesive.

8. The display apparatus according to claim 1, wherein the light guiding plate is a transparent resin plate.

9. The display apparatus according to claim 1, wherein
a hard coat layer is on the first surface and the second surface of the light guiding plate.

10. The optical member according to claim 9, wherein
the hard coat layer is made of an organic material,
a contact angle associated with the organic material with respect to water is greater than or equal to 100 degrees, and
a pencil hardness associated with the organic material is greater than or equal to 4H.

11. An optical member, comprising:
a light guiding plate that is a resin plate;
a first deflection mechanism; and
a second deflection mechanism, wherein
 the optical member is configured to:
  receive light from an image forming apparatus;
  guide the received light; and
  output the received light to an observer,
 the light guiding plate includes a protrusion, a first surface and a second surface,
 the second surface faces the first surface, the protrusion extends from a specific portion of a lateral surface of the light guiding plate, a first ratio of a thickness of the protrusion (t1) to a thickness of the light guiding plate (t0) is less than or equal to 0.05, the first deflection mechanism is on the first surface, the second deflection mechanism is on the second surface, the light guiding plate is configured to:
 receive the light from the image forming apparatus through one of the first surface or the second surface;
 reflect the received light; and
 propagate the received light, the first deflection mechanism is configured to deflect the received light, the second deflection mechanism is configured to deflect the reflected light, and the deflected light exits the light guiding plate through the second surface.

12. A method, comprising:

performing an outer shape process on a resin plate, wherein the resin plate comprises a first deflection mechanism and a second deflection mechanism;

determining a specific outer shape of a light guiding plate based on the outer shape process;

receiving light from an image forming apparatus;

guiding the received light; and outputting the received light from an optical member to an observer, wherein
 the optical member includes the light guiding plate,
 the light guiding plate is formed of the resin plate,
 the light guiding plate includes a protrusion, a first surface and a second surface,
 the second surface faces the first surface,
 the protrusion extends from a portion of a lateral surface of the light guiding plate,
 a first ratio of a thickness of the protrusion (t1) to a thickness of the light guiding plate (t0) is less than or equal to 0.05,
 the first deflection mechanism is on the first surface, and
 the second deflection mechanism is on the second surface.

13. The method according to claim 12, wherein the outer shape process is stamping.

14. The method according to claim 12, wherein the first deflection mechanism and the second deflection mechanism are formed integrally with the resin plate.

15. A stamping apparatus, comprising:

an on-placement base;

a fixation base configured to fix a resin plate to the on-placement base, wherein the resin plate comprises a first deflection mechanism and a second deflection mechanism;

a lower blade; and an upper blade, wherein
 each of the lower blade and the upper blade is configured to perform a stamping process on the resin plate,
 the stamping process is associated with an optical member, the optical member is configured to:
 receive light from an image forming apparatus;
 guide the received light; and
 output the received light to an observer, the optical member includes a light guiding plate, the light guiding plate is the resin plate, the light guiding plate includes a protrusion, a first surface and a second surface, the second surface faces the first surface, the protrusion extends from a portion of a lateral surface of the light guiding plate, a first ratio of a thickness of the protrusion (t1) to a thickness of the light guiding plate (t0) is less than or equal to 0.05, the first deflection mechanism is on the first surface, the second deflection mechanism is on the second surface, the light guiding plate is configured to:
 receive the light from the image forming apparatus through one of the first surface or the second surface;
 reflect the received light; and
 propagate the received light, the first deflection mechanism is configured to deflect the received light, the second deflection mechanism is configured to deflect the reflected light, and the deflected light exits the light guiding plate through the second surface.

16. The stamping apparatus according to claim 15, further comprising:

an alignment reference point on the on-placement base; and an alignment mechanism associated with the alignment reference point, wherein the alignment mechanism is configured to:
 align one of the first deflection mechanism or the second deflection mechanism with the alignment reference point; and
 control, based on the alignment of the one of the first deflection mechanism or the second deflection mechanism with the alignment reference point, a relationship in relative position between the on-placement base and a direction horizontal to the lower blade and the upper blade.

17. The stamping apparatus according to claim 15, wherein a specified space is between the lower blade and the upper blade based on the stamping process.

18. The stamping apparatus according to claim 15, wherein
 a concave portion is in a specific portion in one of the on-placement base or the fixation base,
 the concave portion faces the first deflection mechanism and the second deflection mechanism, and
 the deflection mechanism is out of contact with one of the on-placement base or the fixation base.

* * * * *